US009158592B2

(12) United States Patent
Griglock et al.

(10) Patent No.: US 9,158,592 B2
(45) Date of Patent: Oct. 13, 2015

(54) SYSTEM AND METHOD FOR TIME VARIANT SCHEDULING OF AFFINITY GROUPS COMPRISING PROCESSOR CORE AND ADDRESS SPACES ON A SYNCHRONIZED MULTICORE PROCESSOR

(75) Inventors: Mark Anthony Griglock, Oldsmar, FL (US); Patrick John Huyck, Trinity, FL (US); Sidney Slay Ishee, Odessa, FL (US); James Anthony Gleason, Tarpon Springs, FL (US); Richard Andrew Erich, Palm Harbor, FL (US); Mathew Lowell Aamold, New Port Richey, FL (US)

(73) Assignee: GREEN HILLS SOFTWARE, INC., Santa Barbara, CA (US)

( * ) Notice: Subject to any disclaimer, the term of this patent is extended or adjusted under 35 U.S.C. 154(b) by 517 days.

(21) Appl. No.: 13/462,119

(22) Filed: May 2, 2012

(65) Prior Publication Data

US 2012/0284732 A1  Nov. 8, 2012

Related U.S. Application Data

(60) Provisional application No. 61/481,675, filed on May 2, 2011.

(51) Int. Cl.
*G06F 9/46* (2006.01)
*G06F 9/50* (2006.01)
G06F 9/52 (2006.01)
G06F 9/48 (2006.01)

(52) U.S. Cl.
CPC ............ *G06F 9/5066* (2013.01); *G06F 9/4843* (2013.01); *G06F 9/4887* (2013.01); *G06F 9/505* (2013.01); *G06F 9/5016* (2013.01); *G06F 9/5033* (2013.01); *G06F 9/5083* (2013.01); *G06F 9/52* (2013.01); *G06F 2209/5012* (2013.01)

(58) Field of Classification Search
CPC ... G06F 9/5066; G06F 9/5033; G06F 9/4881; G06F 9/52; G06F 9/4843; G06F 9/4887; G06F 9/5016; G06F 9/505; G06F 9/5083
USPC .................................. 718/100, 103, 104, 105
See application file for complete search history.

(56) References Cited

U.S. PATENT DOCUMENTS

| 4,414,624 A | 11/1983 | Summer, Jr. et al. |
| 4,564,903 A | 1/1986 | Guyette et al. |

(Continued)

OTHER PUBLICATIONS

Jonathan L. Herman, Christopher J. Kenna, Malcolm S. Mollison, James H. Anderson and Daniel M. Johnson, RTOS Support for Multicore Mixed-Criticality Systems. cs.unc.edu/~anderson/papers/rtas12b.pdf Apr. 16-19, 2012 pp. 197-208, 12 Pages.

(Continued)

*Primary Examiner* — Meng An
*Assistant Examiner* — Abu Ghaffari
(74) *Attorney, Agent, or Firm* — Barceló, Harrison & Walker, LLP.

(57) ABSTRACT

Methods and systems for scheduling applications on a multi-core processor are disclosed, which may be based on association of processor cores, application execution environments, and authorizations that permits efficient and practical means to utilize the simultaneous execution capabilities provided by multi-core processors. The algorithm may support definition and scheduling of variable associations between cores and applications (i.e., multiple associations can be defined so that the cores an application is scheduled on can vary over time as well as what other applications are also assigned to the same cores as part of an association). The algorithm may include specification and control of scheduling activities, permitting preservation of some execution capabilities of a multi-core processor for future growth, and permitting further evaluation of application requirements against the allocated execution capabilities.

42 Claims, 22 Drawing Sheets

(56) References Cited

U.S. PATENT DOCUMENTS

| | | | |
|---|---|---|---|
| 4,905,145 A | | 2/1990 | Sauber |
| 5,168,547 A | | 12/1992 | Miller et al. |
| 5,339,443 A | | 8/1994 | Lockwood |
| 5,437,032 A | | 7/1995 | Wolf et al. |
| 5,485,579 A | | 1/1996 | Hitz et al. |
| 5,535,365 A | | 7/1996 | Barriuso et al. |
| 5,742,821 A | | 4/1998 | Prasanna |
| 5,860,126 A | | 1/1999 | Mittal |
| 6,047,316 A | | 4/2000 | Barton et al. |
| 6,289,369 B1 | | 9/2001 | Sundaresan |
| 6,542,926 B2 | | 4/2003 | Zalewski et al. |
| 6,629,209 B1 | | 9/2003 | Arimilli et al. |
| 6,629,212 B1 | | 9/2003 | Arimilli et al. |
| 6,728,959 B1 | | 4/2004 | Merkey |
| 6,745,222 B1 | | 6/2004 | Jones et al. |
| 6,957,432 B2 | | 10/2005 | Ballantyne |
| 7,103,631 B1 | | 9/2006 | van der Veen |
| 7,209,996 B2 | | 4/2007 | Kohn et al. |
| 7,239,581 B2 | * | 7/2007 | Delgado et al. ............ 368/10 |
| 7,287,254 B2 | * | 10/2007 | Miller et al. ............ 718/102 |
| 7,694,302 B1 | * | 4/2010 | Rajan et al. ............ 718/104 |
| 7,716,006 B2 | * | 5/2010 | Coskun et al. ............ 702/132 |
| 7,793,293 B2 | | 9/2010 | Norton et al. |
| 8,051,418 B1 | * | 11/2011 | Dice ............ 718/102 |
| 8,180,973 B1 | * | 5/2012 | Armangau et al. ............ 711/147 |
| 8,429,663 B2 | * | 4/2013 | Takagi et al. ............ 718/104 |
| 2006/0095909 A1 | | 5/2006 | Norton et al. |
| 2006/0123420 A1 | | 6/2006 | Nishikawa |
| 2007/0220517 A1 | * | 9/2007 | Lippett ............ 718/102 |
| 2008/0196031 A1 | | 8/2008 | Danko |
| 2009/0031317 A1 | | 1/2009 | Gopalan et al. |
| 2009/0031318 A1 | * | 1/2009 | Gopalan et al. ............ 718/103 |
| 2009/0217280 A1 | | 8/2009 | Miller et al. |
| 2010/0131955 A1 | | 5/2010 | Brent et al. |
| 2010/0199280 A1 | | 8/2010 | Vestal et al. |
| 2011/0023047 A1 | * | 1/2011 | Memik et al. ............ 718/104 |
| 2011/0055518 A1 | | 3/2011 | Hotra et al. |
| 2011/0154346 A1 | * | 6/2011 | Jula ............ 718/103 |

OTHER PUBLICATIONS

Aurélien Monot, Nicolas Navet, Françoise Simonot, Bernard Bavoux, Multicore Scheduling in Automotive ECUs, ieeexplore. ieee.org/xpl/mostRecentIssue.jsp?punumber=5609073 Jul. 4-7, 2010 pp. 3734-3741. 9 Pages.

Patrik Stromblad, The Future of Multicore OS: Future Challenges for Embedded Operating Systems and Applications sics.se/files/Enea_MC_day.pdf. 30 Pages.

Cory Bialowas, Achieving Business Goals with Wind River's Multicore Software Solution, White Paper, Jan. 2009, eetimes.com/electrical-engineers/education-training/tech-papers/4135977/Achieving-Business-Goals-with-Wind-River-s-Multicore-Software-Solution. 4 Pages.

Dynamic Logical Partitioning, QPS01—IBM System p Apv—120, © Copyright IBM Corporation 2007. 29 Pages.

Enrico Bini, Marko Bertogna, Sanjoy Baruah, The Parallel Supply Function Abstraction for a Virtual Multiprocessor, retis.sssup.it/~bini/publications/2010BinBerBar.pdf. 14 Pages.

Kenji Funaoka, Shinpei Kato, and Nobuyuki Yamasaki, Energy-Efficient Optimal Real-Time Scheduling on Multiprocessors, ieeexplore.ieee.org/xpl/mostRecentIssue.jsp?punumber=4519543 May 5-7, 2008 pp. 23-30, 8 Pages.

Aloysius K. Mok, Xiang (Alex) Feng, Deji Chen, Resource Partition for Real-Time Systems, RTAS '01 Proceedings of the Seventh Real-Time Technology and Applications Symposium (RTAS '01), p. 75 IEEE Computer Society Washington, DC, USA © 2001. 10 Pages.

El-Haj Mahmoud, Ali Ahmad. Hard-Real-Time Multithreading: A Combined Microarchitectural and Scheduling Approach. 2006, repository.lib.ncsu.edu/ir/bitstream/1840.16/3182/1/etd.pdf. 178 Pages.

Malcolm S. Mollison, Jeremy P. Erickson, James H. Anderson, Sanjoy K. Baruah and John A. Scoredos, Mixed-Criticality Real-Time Scheduling for Multicore Systems, cs.unc.edu/~anderson/papers/icess10.pdf. 8 Pages.

Aloysius K. Mok, Xiang Feng, Zhengting He, Implementation of Real-Time Virtual CPU Partition on Linux linuxfordevices.com/files/rtlws-2005/AloysiusMok.pdf. 14 Pages.

Håakon Kvale Stensland, Carsten Griwodz, Pål Halvorsen, Evaluation of Multi-Core Scheduling Mechanisms for Heterogeneous Processing Architectures, NOSSDAV '08 Proceedings of the 18th International Workshop on Network and Operating Systems Support for Digital Audio and Video pp. 33-38 2008. 6 Pages.

Yi Zhang, Nan Guan, and Wang Yi, Towards the Implementation and Evaluation of Semi-Partitioned Multi-Core Scheduling, Date Workshop PPES 2011, Mar. 18, 2011, pp. 42-46. DOI: 10.4230/OASIcs.PPES.2011.42, URN: urn:nbn:de:0030-drops-30804, URL: drops.dagstuhl.de/opus/volltexte/2011/3080/. 5 Pages.

Processor Affinity—Wikipedia, Retrieved from "en.wikipedia.org/wiki/Processor_affinity" 3 Pages.

Mentor Embedded: Multi-OS on Multicore Solutions Datasheet, Copyright © 2011 Mentor Graphics Corporation. 2 Pages.

Set Process Affinity Mask Function "//msdn.microsoft.com/en-us/library/windows/desktop/ms686223(v=vs.85).aspx" Microsoft Windows Dev Center—Desktop. 7 Pages.

* cited by examiner

```
PartitionSchedule   1
    PartitionSubSchedule   1              PartitionSubSchedule   2
        MajorFramePeriod   20                 MajorFramePeriod   20
        Partition   1                          Partition   1
            AffinityGroup   1                      AffinityGroup   3
                Offset      0                          Offset      0
                ExecTime    4                          ExecTime    4
                Offset      9                          Offset     10
                ExecTime    2                          ExecTime    5
                Offset     17                      EndPartition
                ExecTime    3                      Partition   2
            EndPartition                           AffinityGroup   4
                                                       Offset      5
        Partition   2                                  ExecTime    5
            AffinityGroup   2                          Offset     17
                Offset      5                          ExecTime    3
                ExecTime    4                      EndPartition
                Offset     11                  EndPartitionSubSchedule
                ExecTime    4
            EndPartition
    EndPartitionSubSchedule
    PartitionSubSchedule   3              PartitionSubSchedule   4
        MajorFramePeriod   20                 MajorFramePeriod   20
        Partition   1                          Partition   1
            AffinityGroup   5                      AffinityGroup   7
                Offset      0                          Offset      0
                ExecTime    2                          ExecTime    1
                Offset      6                          Offset      5
                ExecTime   10                          ExecTime    4
            EndPartition                               Offset     17
                                                       ExecTime    3
        Partition   2                          EndPartition
            AffinityGroup   6
                Offset      2                      Partition   2
                ExecTime    2                      AffinityGroup   8
                Offset     17                          Offset      1
                ExecTime    3                          ExecTime    3
            EndPartition                               Offset     11
    EndPartitionSubSchedule                            ExecTime    4
                                           EndPartition
                                       EndPartitionSubSchedule
                                   EndPartitionSchedule
```

FIG. 10B

```
AffinityGroup 1                          AffinityGroup 5
        CoreID      1                            CoreID      1
        CoreID      2                            CoreID      2
 1110   CoreID      3                    1150    CoreID      3
        PrimaryAddressSpace AS1                  PrimaryAddressSpace AS8
EndAffinityGroup                         EndAffinityGroup AffinityGroup 2                          AffinityGroup 6
        CoreID      1                            CoreID      1
        CoreID      2                            CoreID      2
        CoreID      3                            CoreID      3
 1120   PrimaryAddressSpace AS2                  BackgroundMaxPriority  15
        PrimaryAddressSpace AS3                  BackgroundAddressSpace AS1
EndAffinityGroup                                 BackgroundAddressSpace AS2
                                          1160   BackgroundAddressSpace AS3
AffinityGroup 3                                  BackgroundAddressSpace AS4
        CoreID      1                            BackgroundAddressSpace AS5
        CoreID      2                            BackgroundAddressSpace AS6
        CoreID      3                            BackgroundAddressSpace AS7
        PrimaryAddressSpace AS4                  BackgroundAddressSpace AS8
        PrimaryAddressSpace AS5                  RestartAddressSpace AS1
 1130   PrimaryAddressSpace AS6          EndAffinityGroup
        BackgroundMaxPriority  10
        BackgroundAddressSpace AS1       AffinityGroup 7
        BackgroundAddressSpace AS2               CoreID      4
        BackgroundAddressSpace AS3               BackgroundMaxPriority  15
EndAffinityGroup                                 BackgroundAddressSpace AS1
                                          1170   BackgroundAddressSpace AS4
AffinityGroup 4                                  BackgroundAddressSpace AS5
        CoreID      1                            BackgroundAddressSpace AS6
 1140   CoreID      2                            RestartAddressSpace AS4
        CoreID      3                            RestartAddressSpace AS5
        PrimaryAddressSpace AS7                  RestartAddressSpace AS6
EndAffinityGroup                         EndAffinityGroup
```

SYSTEM AND METHOD FOR TIME VARIANT SCHEDULING OF AFFINITY GROUPS COMPRISING PROCESSOR CORE AND ADDRESS SPACES ON A SYNCHRONIZED MULTICORE PROCESSOR

RELATED APPLICATIONS

This application is a non-provisional of and claims priority under 35 U.S.C. §119 to U.S. Application No. 61/481,675, filed May 2, 2011, entitled TIME-VARIANT SCHEDULING OF AFFINITY GROUPS ON A MULTI-CORE PROCESSOR, which is incorporated by reference herein in its entirety.

BACKGROUND OF THE DISCLOSURE

1. Field of the Disclosure

The disclosure relates generally to methods for scheduling applications on a multi-core processor.

2. General Background

The advent of faster and more capable processors has resulted in the development of operating systems features that permit previously independent applications running on completely independent processors to be ported to an operating environment where the independent applications share a processor. Separation and scheduling mechanisms have been defined and fielded that support simultaneous hosting of multiple applications on a single-core processor. Previous scheduling mechanisms have included priority based schedulers, time-partitioning schedulers, cooperative schedulers, and many other schedulers, including schedulers that combine techniques. Each scheduling mechanism has capabilities that are beneficial to some uses but include tradeoffs for other uses.

Additional processor capabilities in terms of supporting multiple computing cores (i.e., multi-core) within a single processor, are increasingly becoming standard, with more cores seemingly being integrated with each passing revision. A multi-core processor is an integrated electronic device that contains two or more independent processing elements (i.e., cores, with or without dedicated caches) on which execution sequences can simultaneously execute. These cores are interconnected with each other and the remaining system resources (e.g., data memory, program memory, hardware devices) through hardware capabilities provided by the multi-core processor. The composite execution capabilities of the multi-core platform should mean that there is sufficient bandwidth to add new applications (or extend existing applications) in the future, provided the scheduling mechanism includes sufficient support to preserve unallocated processor core resources and sufficient granularity to allocate those resources, independent of which core contains unallocated resources.

Several general multi-core usage paradigms have been developed, including: (1) Asymmetric Multi Processing (AMP), where each core runs a completely independent executable; (2) Symmetric Multi Processing (SMP), where an executable is designed to make use of multiple cores simultaneously; (3) Combinations of both (some cores used for AMP, other cores used for SMP).

The rigidness of these usage paradigms is highlighted when additional applications are attempted to be added to a multi-core processor based platform. A typical implementation, during initialization, may associate a core or set of cores with an application or group of applications. For example, elemental associations (processor sets) used for scheduling may be defined, such that there may be an association of processor cores within the processor sets. However, processor cores in such applications are not shared between processor sets. While any unallocated core can be utilized for new applications (or to extend an existing application), a new application cannot be defined that utilizes spare capacity on cores assigned to different processor sets. Other implementations may not associate cores with any application. For example, elemental associations (scheduling domains) used for scheduling may be defined, such that there is intentionally no association of a processor core within the scheduling domain. As such, in such implementations, preservation of core resources is not enforced (e.g., all available processor core capabilities may be utilized, including capabilities intended to be preserved for future use or capabilities not intentionally used due to application programming errors).

Accordingly, it is desirable to address the limitations in the art.

SUMMARY

Methods and systems relating to scheduling applications on a multi-core processor are disclosed. Since any single core may provide more execution capabilities than any single application requires and some of these applications may be designed to utilize multiple cores simultaneously (including utilizing different numbers of cores at various times during execution), a new scheduling method that efficiently and practically utilizes multi-core processors is necessary. In one embodiment, this method, time-variant scheduling, defines scheduling for groupings of how cores will be utilized by one or more applications, with the grouping of cores and applications being permitted to vary over time. One component of time-variant scheduling is the forming of association of cores and applications into groupings, referred to as affinity groups. Affinity groups can be formed to define any association of cores and applications, but typically are formed to correspond to some intended function (or functions). When an affinity group is selected for scheduling on a core (or set of cores), its associated address-spaces are exclusively scheduled on the associated cores (i.e., all other address-spaces are excluded from using the allocated cores). The affinity groups are scheduled independently of other affinity groups, permitting sequences that closely correspond to application requirements, yet also permitting other affinity groups to be developed that can make use of cores that are not being utilized or fully utilized. Any new application (or extension of an existing application) can make use of the unallocated execution time across the entire multi-core processor. Other aspects and advantages of various aspects of the present invention can be seen upon review of the figures and of the detailed description that follows.

In certain embodiments, a method for scheduling applications on a multi-core processor comprising a plurality of processor cores is disclosed, the method comprising: associating a first at least one processor core and a first plurality of address spaces with a first affinity group; associating a second at least one processor core and a second plurality of address spaces with a second affinity group; and scheduling one or more of the first affinity group and the second affinity group to execute on associated cores of the multi-core processor, wherein the step of scheduling further comprises: releasing a first processor core for scheduling; synchronizing the plurality of processor cores; processing a scheduling event for the first processor core; associating the first processor core with the affinity group associated with the scheduling event; and assigning a plurality of address spaces to the first processor core for the scheduling event. The scheduling event may comprise task-core affinity for at least one task. At least one task-core affinity may be designated to be changeable at run-time. A task-core affinity may be designated not to be changeable at run-time. The method may further comprise synchronizing the first core with any of the plurality of processor cores associated with the scheduling event. The method may further comprise synchronizing the first core with at least one of the plurality of processor cores associated with the affinity group associated with the scheduling event. The step of scheduling may further comprise scheduling at least one of the first one or more processor cores according to a predefined sequence of affinity groups. The step of processing the scheduling event may comprise selecting an affinity group for which all of the associated cores are available and none of the associated address spaces are currently running on another core.

In certain embodiments, a method for scheduling applications on a multi-core processor comprising a plurality of processor cores is disclosed, the method comprising: associating a first at least one processor core and a first plurality of address spaces with a first affinity group; associating a second at least one processor core and a second plurality of address spaces with a second affinity group; and scheduling one or more of the first affinity group and the second affinity group to execute on associated cores of the multi-core processor. The first affinity group may comprise at least one dependency group comprising a plurality of address spaces that share at least one resource. The method may further comprise scheduling a plurality of address spaces associated with at least one dependency group. The second at least one affinity group may comprise at least one of the at least one dependency group. Only applications associated with the first plurality of address spaces may be eligible to be scheduled on the first at least one processor core when the first affinity group is being executed. At least one of the first plurality of address spaces may be a primary address space eligible to run on any of the first at least one processor core. At least one of the first plurality of address spaces may be a restart address space eligible to restart on any of the first at least one processor core. At least one of the first plurality of address spaces may be a background address space eligible to run in the background on any of the first at least one processor core. The step of scheduling a background address space may further comprise scheduling based on a priority less than a predetermined threshold. The step of scheduling may further comprise activating one of a plurality of schedules for at least one of the associated cores. The step of scheduling may comprise scheduling the first affinity group and the second affinity group to execute simultaneously on one or more cores of the multi-core processor. The step of scheduling may further comprise scheduling at least one of the first one or more processor cores according to a predefined sequence of affinity groups. The first plurality of address spaces may comprise at least one address space in the second plurality of address spaces. The first at least one affinity group may comprise at least one address space in the second at least one affinity group. The method may further comprise scheduling a task to run on a processor core according to a task-core affinity for the task. The method may further comprise scheduling a task to run on a processor core according to a task-core affinity if the task has an affinity for a processor core associated with the affinity group scheduled for execution. The method may further comprise not scheduling a task for execution with an affinity group if the task has an affinity for a processor core that is not associated with the affinity group. The step of scheduling may further comprise: releasing a first address space for scheduling; synchronizing the plurality of processor cores; processing a scheduling event for the first address space; and assigning the first address space to a processor core for the scheduling event.

In certain embodiments, a method for scheduling applications on a multi-core processor comprising a plurality of processor cores is disclosed, the method comprising: associating a first at least one affinity group with a first subsystem; associating a second at least one affinity group with a second subsystem; wherein the first at least one affinity group has no cores in common and no address spaces in common with the second at least one affinity group, whereby the first subsystem can be scheduled independently of the second subsystem.

In certain embodiments, a system for scheduling applications on a multi-core processor is disclosed, comprising: a plurality of affinity groups each comprising one or more processor cores and a plurality of address spaces; and a scheduler configured for assigning one or more of the plurality of affinity groups to execute on associated cores of the multi-core processor, wherein the scheduler is further configured for: releasing a first processor core for scheduling; synchronizing the plurality of processor cores; processing a scheduling event for the first processor core; associating the first processor core with an affinity group associated with the scheduling event; and assigning a plurality of address spaces to the first processor core for the scheduling event. The scheduling event may comprise task-core affinity for at least one task. At least one task-core affinity may be designated to be changeable at run-time. A task-core affinity may be designated not to be changeable at run-time. The scheduler may be further configured for synchronizing the first core with any of the plurality of processor cores associated with the scheduling event. The scheduler may be further configured for synchronizing the first processor core with at least one of the processor cores associated with the affinity group associated with the scheduling event. The scheduler may be further configured for scheduling at least one processor core according to a predefined sequence of affinity groups. The scheduler may be further configured for selecting an affinity group for which all of the associated cores are available and none of the associated address spaces are currently running on another core.

In certain embodiments, a system for scheduling applications on a multi-core processor is disclosed, comprising: a plurality of affinity groups each comprising one or more processor cores and a plurality of address spaces; and a scheduler configured for assigning one or more of the plurality of affinity groups to execute on associated cores of the multi-core processor. Only applications associated with the address spaces assigned to an affinity group may be eligible to be assigned to the processor cores assigned to the affinity group scheduled for execution. At least one of the plurality of affinity groups may comprise at least one dependency group comprising a plurality of address spaces that share at least one resource. The scheduler may be further configured for scheduling a plurality of address spaces associated with at least one dependency group. At least two of the plurality of affinity groups may share a dependency group. The scheduler may be further configured for activating one of a plurality of schedules for at least one of the associated cores. The scheduler may be further configured for scheduling a task to run on a processor core according to a task-core affinity for the task. The scheduler may be configured to schedule a task to run on a processor core according to a task-core affinity if the task has an affinity for a processor core associated with the affinity group scheduled for execution. The scheduler may be configured not to schedule a task for execution with an affinity group if the task has an affinity for a processor core that is not associated with the affinity group. Each of the affinity groups may have no processor cores and no address spaces in common with any of the other of the plurality of affinity groups, to permit each of the plurality of affinity groups to be scheduled independently. The scheduler may be further configured for scheduling a first affinity group and a second affinity group to execute simultaneously. The scheduler may be further configured for scheduling at least one processor core according to a predefined sequence of affinity groups. The first plurality of address spaces may comprise at least one address space in the second plurality of address spaces. The first at least one affinity group may comprise at least one address space in the second at least one affinity group. The scheduler may be further configured to propagate timing events of the first processor core to at most, the plurality of processor cores associated with the scheduling event. The scheduler may be further configured for: releasing a first address space for scheduling; synchronizing the plurality of processor cores; processing a scheduling event for the first address space; and assigning the first address space to a processor core for the scheduling event.

In certain embodiments, a system for scheduling applications on a multi-core processor is disclosed, comprising: a plurality of subsystems each comprising one or more affinity groups, wherein each of one or more affinity groups comprises one or more processor cores and a plurality of address spaces; and a scheduler configured for assigning one or more of the plurality of affinity groups to execute on associated cores of the multi-core processor; wherein each of the subsystems has no processor cores and no address spaces in common with any of the other of the plurality of subsystems, to permit each of the plurality of subsystems to be scheduled independently.

BRIEF DESCRIPTION OF THE DRAWINGS

By way of example, reference will now be made to the accompanying drawings, which are not to scale.

FIG. 10B shows a sample data structure and configuration that may be used to control the scheduling of the affinity groups of FIG. 10A.

FIG. 11A shows sample affinity group associations of address-spaces and cores with some affinity groups utilizing unique cores and one or more unique address-spaces and other affinity groups sharing cores and address-spaces. This is exemplary of an Asymmetric Multiprocessing (AMP)/Symmetric Multiprocessing (SMP) hybrid configuration using the method according to aspects of the present invention.

DETAILED DESCRIPTION

Figure 1A:
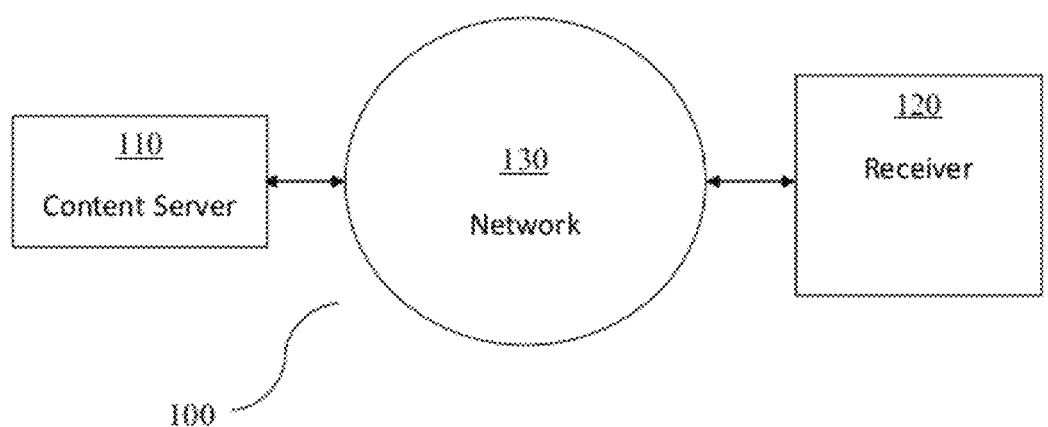
FIG. 1A illustrates an exemplary networked environment and its relevant components according to aspects of the present invention.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1A depicts an exemplary networked environment 100 in which systems and methods, consistent with exemplary embodiments, may be implemented. As illustrated, networked environment 100 may include a content server 110, a receiver 120, and a network 130. The exemplary simplified number of content servers 110, receivers 120, and networks 130 illustrated in FIG. 1A can be modified as appropriate in a particular implementation. In practice, there may be additional content servers 110, receivers 120, and/or networks 130.

In certain embodiments, a receiver 120 may include any suitable form of multimedia playback device, including, without limitation, a cable or satellite television set-top box, a DVD player, a digital video recorder (DVR), or a digital audio/video stream receiver, decoder, and player. A receiver 120 may connect to network 130 via wired and/or wireless connections, and thereby communicate or become coupled with content server 110, either directly or indirectly. Alternatively, receiver 120 may be associated with content server 110 through any suitable tangible computer-readable media or data storage device (such as a disk drive, CD-ROM, DVD, or the like), data stream, file, or communication channel.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 100 may perform one or more of the tasks described as being performed by one or more other components of networked environment 100.

Figure 2A:
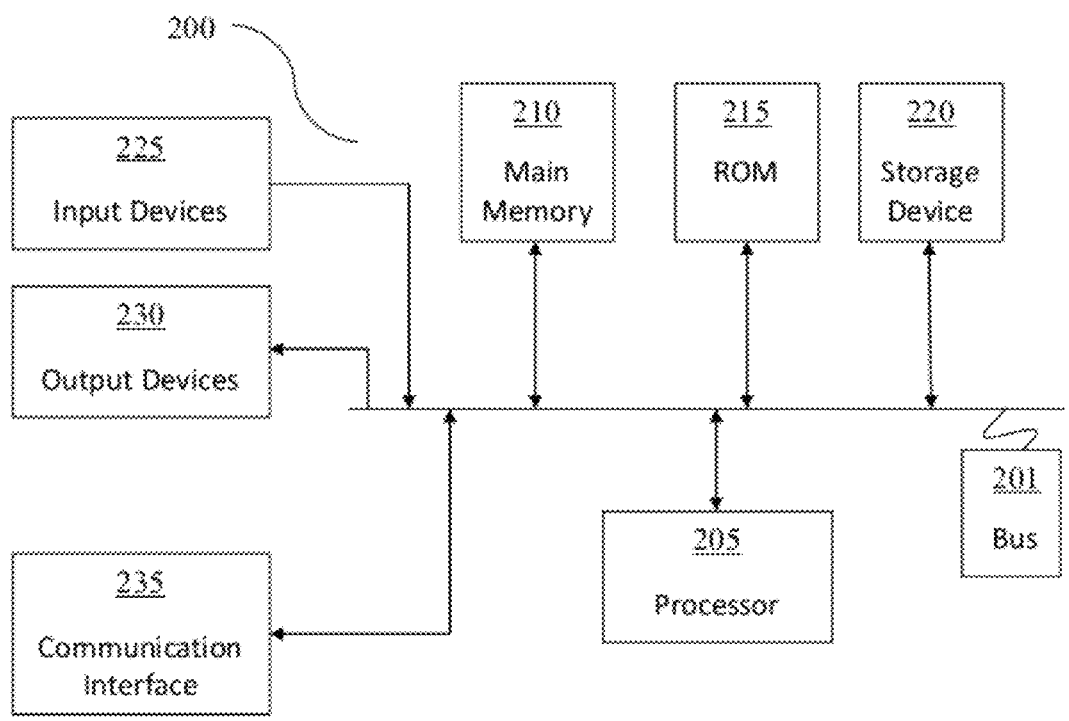
FIG. 2A is an exemplary block diagram of a computing device that may be used to implement aspects of certain embodiments of the present invention.

FIG. 2A is an exemplary diagram of a computing device 200 that may be used to implement aspects of certain embodiments of the present invention, such as aspects of content server 110 or of receiver 120. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. The processor 205 may be capable of interpreting and executing multiple sequences of instructions substantially simultaneously. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 130 as shown in FIG. 1A.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1A, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 130. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 130. For example, source data or other information received from devices connected to the network 130 may be output via the browser. Also, both the browser and the browser assistant are capable of performing operations on the received source information prior to outputting the source information. Further, the browser and/or the browser assistant may receive user input and transmit the inputted data to devices connected to network 130.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

In the following description, a preferred embodiment of the method is described in terms of preferred data structures, preferred and optional enforcements, preferred control flows, and examples. Other and further application of the described method, as would be understood after review of this application by those with ordinary skill in the art, are within the scope of the invention.

The following terminology and meanings are used to describe embodiments of the invention. These terms are not intended to be limiting.

Core—In a multi-core processor, a "core" represents the independent hardware processing element on which applications will execute. An N-core processor means that there are N independent hardware processing elements that can simultaneously execute at any instance of time.

Address-Space—An "address-space" is an operating system managed association that defines the operational environment in which an application will be executed. An address-space includes memory and device resources; an abstracted (or actual) range of memory addresses to which the memory and device resources may be assigned; one or more execution contexts; and a set of operating system interfaces. Address-spaces are further refined by the degree of processor access authorized by associated core privileges. A "virtual" address-space executes in a core's least privileged operating environment (e.g., user mode). A "kernel" address-space executes in a core's more privileged operating environment (e.g., kernel mode, hypervisor mode, supervisor mode, etc.), including authorizations that permit execution in a core's most privileged operating environment (e.g., same mode as the operating system). One of ordinary skill in the art will recognize that other privilege levels are also within the scope of this the invention. An address-space can be scheduled as either Primary, Background or Restart or combinations thereof.

Primary Address Space—A "primary address space" is an address-space assigned to one or more cores, via an affinity group grouping, where some or all tasks from the address-space may be run.

Background Address Space—A "background address space" is an address-space assigned to one or more cores on which tasks from the address space may run in the background based on assigned priorities or other Task scheduling means. Tasks may be assigned to a background address space and may be run on any of the cores allocated to the affinity group to which the background address space is assigned.

Restart Address Space—A "restart address space" is an address-space assigned to one or more cores where the address space can be rescheduled/restarted. A restart address space can be restarted on any of the cores allocated to the affinity group to which the restart address space is assigned. Scheduling of a restart address space may be utilizing portions of an assigned time window or may be dynamically utilizing portions of unassigned time windows.

Application—An "application" is the executable object code and memory resource assignments designed to perform some intended function on the multi-core platform. Applications may be assigned to one or more address-spaces.

Affinity Group—An "affinity group" is an operating system managed association that includes cores and address-spaces. For this method, affinity groups are the basic element of time scheduling on the multi-core platform. The operating system schedules the multi-core's execution time based on the affinity groups. Multiple affinity groups may be defined.

Task-Core Affinity—A "task-core affinity" is an operating system managed association that associates a task with a particular core such that the task may only be executed by that core. A task-core affinity may be changed at run-time if the particular task-core affinity has been designated to be changeable. If not designated to be changeable, then the task-core affinity cannot be changed at run-time.

Dependency Group—A "dependency group" is an operating system managed association that consists of a group of address-spaces that have some kind of resource in common. Resources can include, but are not limited to, items such as semaphores, information flows, other address spaces or portions thereof, and hardware devices. Not all address-spaces in a dependency group need to share all the same resources.

Schedule—In this method, a "schedule" includes a set of affinity groups designed to be executed on a multi-core processor within a scheduler's time window, and a description on how and when they may be executed. Multiple schedules, with different combinations of affinity groups and execution resources, may be defined. Sub-schedules may be utilized to form a hierarchy of schedules.

Task—A "task" is an operating system managed association that defines a unique execution context being utilized by an application. Each address-space has one or more tasks associated with it. Tasks permit execution parallelism within an application. Tasks may be assigned or inherit priorities that may be used by an operating system to select which task context to assign to a core for execution.

Figure 1B:
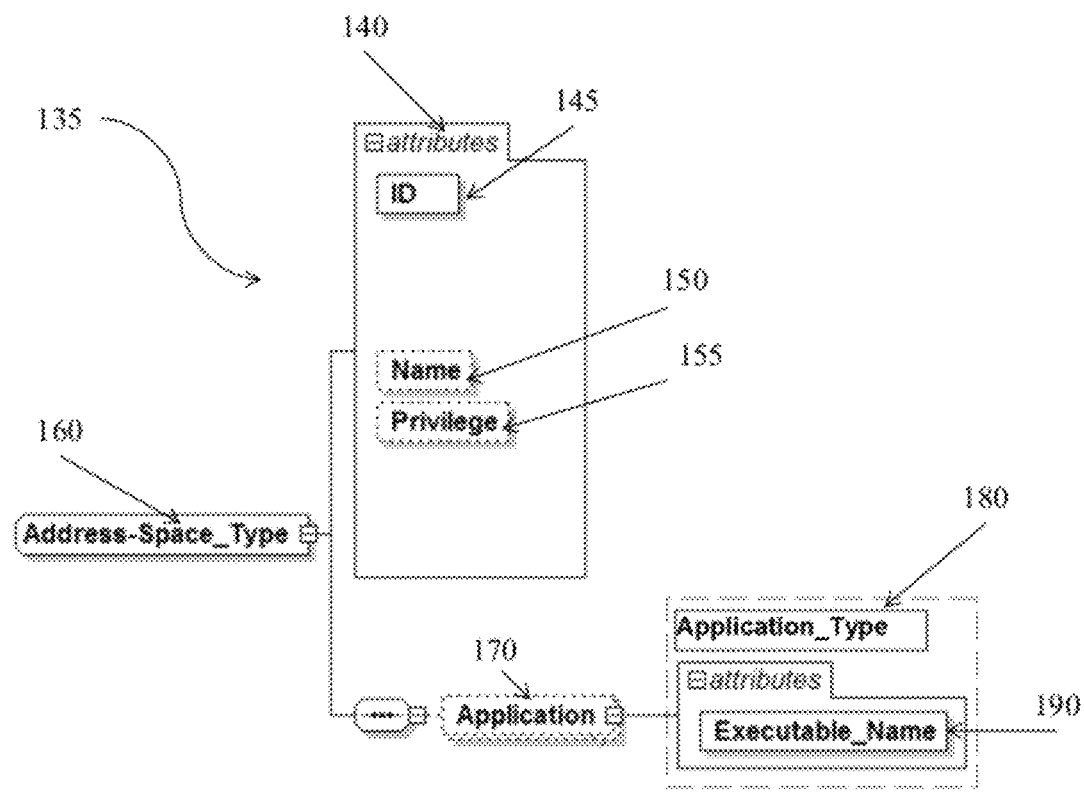
FIG. 1B shows attribute definitions and associations for an "address space" according to aspects of the present invention.
Figure 2B:
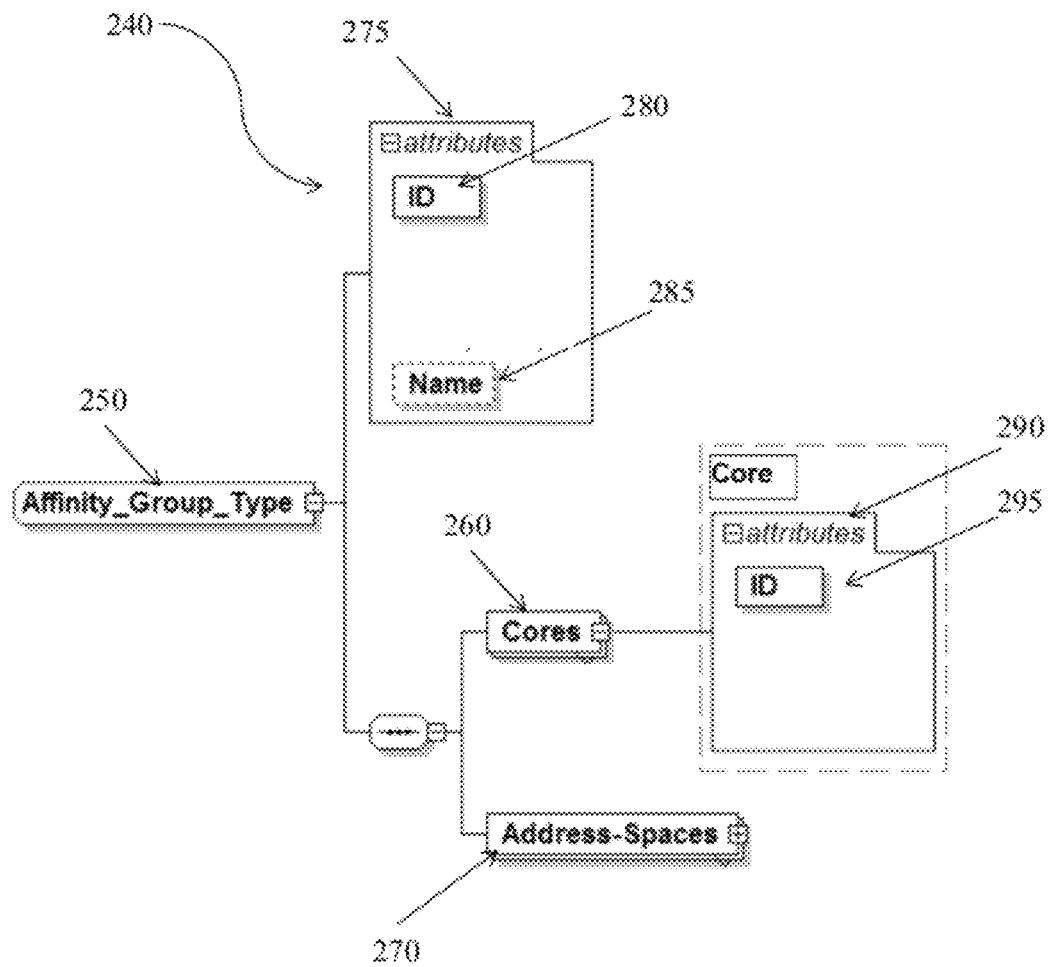
FIG. 2B shows attribute definitions and associations for an "affinity group" according to aspects of the present invention.
Figure 3:
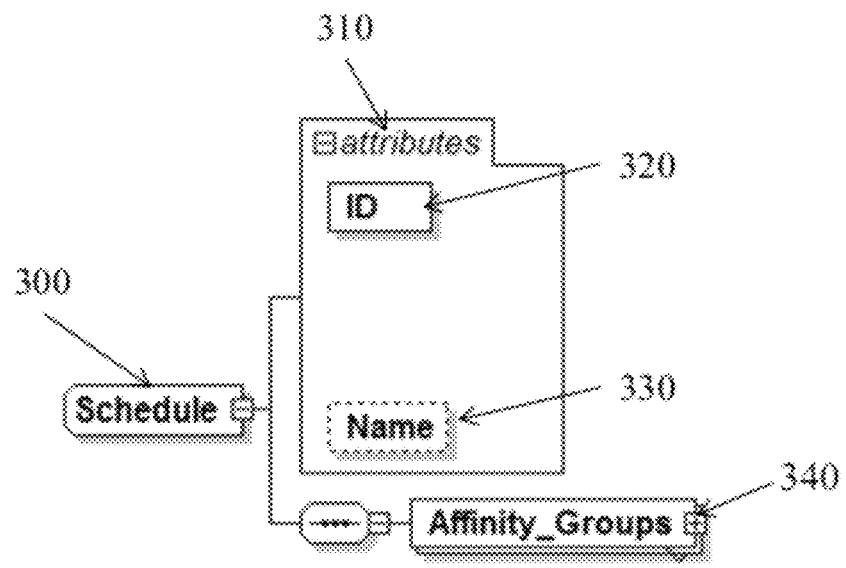
FIG. 3 shows attribute definitions and associations for a "schedule" according to aspects of the present invention.

FIG. 1B, FIG. 2B, and FIG. 3 illustrate data structures that show basic attribute definitions and associations for address-spaces, affinity groups, cores (as part of FIG. 2B) and schedules.

FIG. 1B shows the basic elements of an address-space 135, based on an Address-Space_Type 160. The address space may include attributes 140, which may include ID 145, a unique identification assigned to the address space; Name 150; and Privilege 155, which may define the privilege level of the address space (e.g., kernel, virtual, etc.). The address space 135 further may include an explicit association of zero or more applications 170 with the address-space 135. Association of zero applications with an address-space covers the case when an address-space does not have an explicit association with an application as part of its definition (e.g., when an application is loaded into and associated with the address-space during run-time). The applications 170 may include an Application_Type 180, which may include attributes including but not limited to Executable_Name 190.

Figure 5:
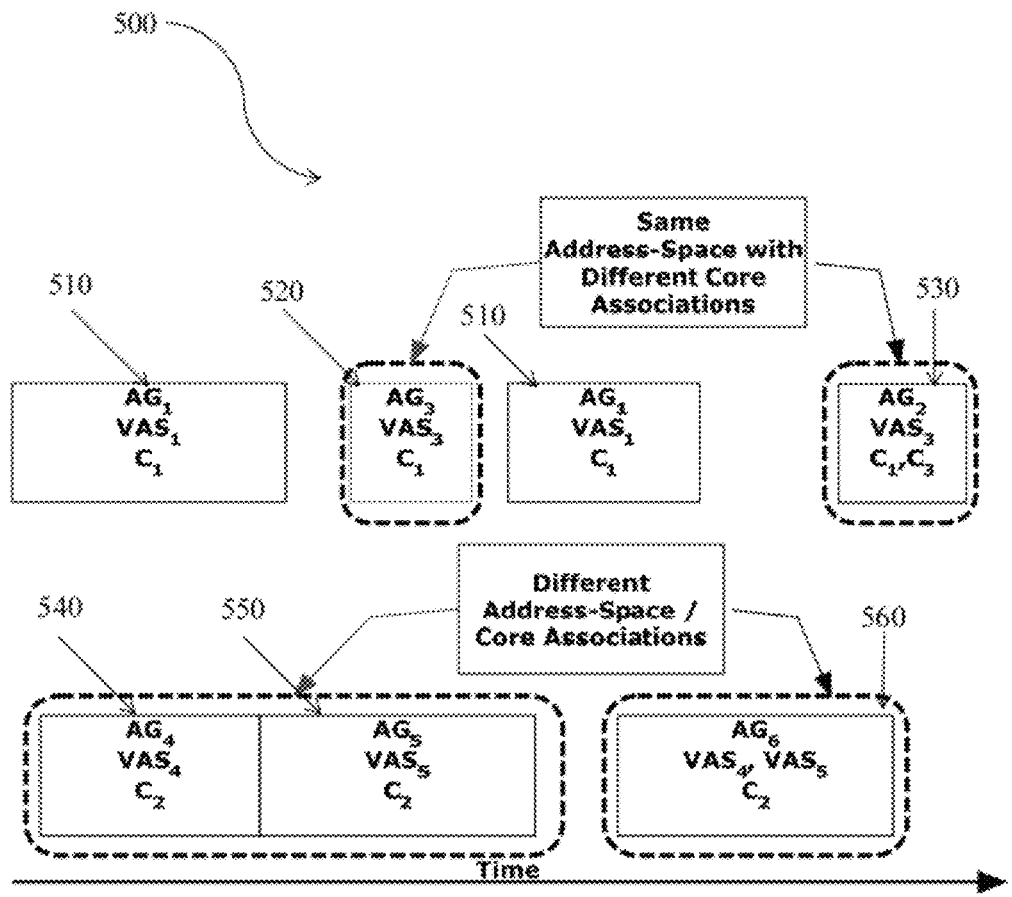
FIG. 5 and FIG. 6 show examples of valid affinity group associations and schedules according to aspects of the present invention.
Figure 6:
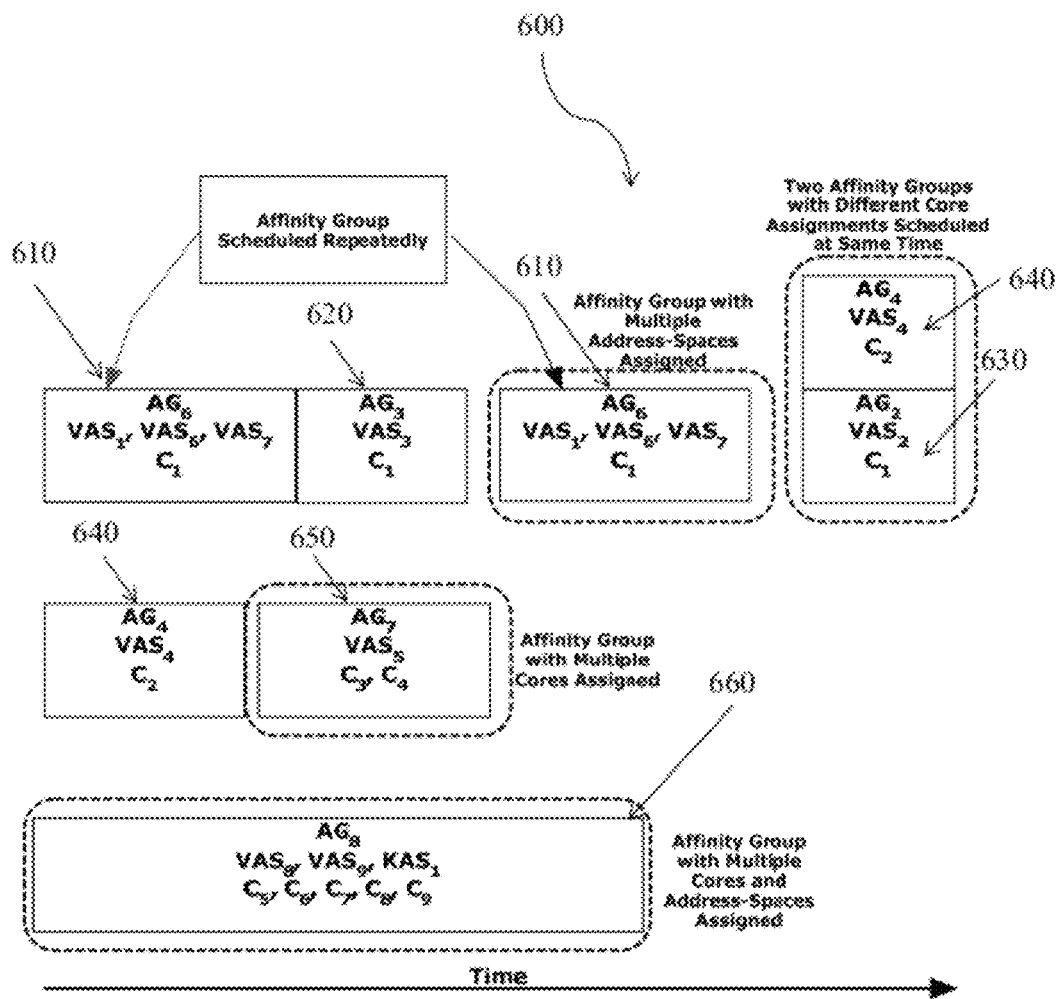

FIG. 2B shows an exemplary association of affinity groups 240, based on Affinity_Group_Type 250, whose member elements include specific associations of cores 260 with address-spaces 270. Each defined affinity group 240 must contain at least one core 260 and one address-space 270, but may include as many cores 260 and address-spaces 270 as required to form a specific association between cores 260 and address-spaces 270. Each affinity group 240 may include attribute 275, which may include but not be limited to ID 280, a unique identification assigned to the affinity group, and Name 285. Each core 260 may include attributes 290, which may include ID 295. FIG. 5 and FIG. 6 show examples of various associations of affinity groups, including affinity groups that contain single core and address-space pairs; multiple address-spaces and a single core; single address-spaces and multiple cores; multiple address-spaces and multiple cores; as well as combinations where an address-space is running by itself in one affinity group and running with another address-space in another affinity group.

FIG. 3 shows the basic elements of a schedule 300 in accordance with certain embodiments of this invention. Each schedule 300 comprises certain attributes 310, which may include without limitation an ID 320 and/or name 330, and is an association of one or more affinity groups 340 and execution resources defined to execute on a multi-core processor. Multiple schedules and a hierarchy of schedules (sub-schedules) can be defined, each with unique (or identical) combinations of affinity groups, and selected between as part of certain embodiments of the invention.

FIG. 5 and FIG. 6 show examples of schedules, including affinity groups running in parallel and affinity groups running when no other affinity group is running. For example, in FIG. 5 an exemplary schedule 500 for affinity groups 1-6. In this exemplary embodiment, affinity group 1 510 comprises virtual address space 1 and core 1 and is scheduled to run at two different times. In the displayed embodiment, affinity group 2 530 and Affinity Group 3 520 both comprise virtual address space 3, but include different core associations on which to run that address space. In the displayed embodiment, affinity group 4 540, affinity group 5 550 and affinity group 6 560 are each scheduled to run on core 2 but have different address spaces or combinations of address space associated with each affinity group. FIG. 6 displays an alternate schedule 600 comprising additional exemplary combinations of address spaces and cores with affinity groups. In particular, in the displayed exemplary embodiment, affinity group 6 610 comprises multiple virtual address spaces associated with a single core, which is scheduled repeatedly. Affinity group 3 620 may include a single virtual address space associated with a single core. In the displayed embodiment, affinity group 2 630 comprising virtual address space 2 and core 1 is scheduled to run at the same time as affinity group 4 640, which comprises virtual address space 4 and core 2. The embodiment of FIG. 6 also shows exemplary affinity group 7 650 comprises a single virtual address space scheduled to run on multiple cores and exemplary affinity group 8 660 which comprises multiple address spaces assigned to multiple cores. When a schedule is selected, the affinity groups defined as part of the schedule are eligible to be selected for execution on the multi-core processor.

Figure 8:
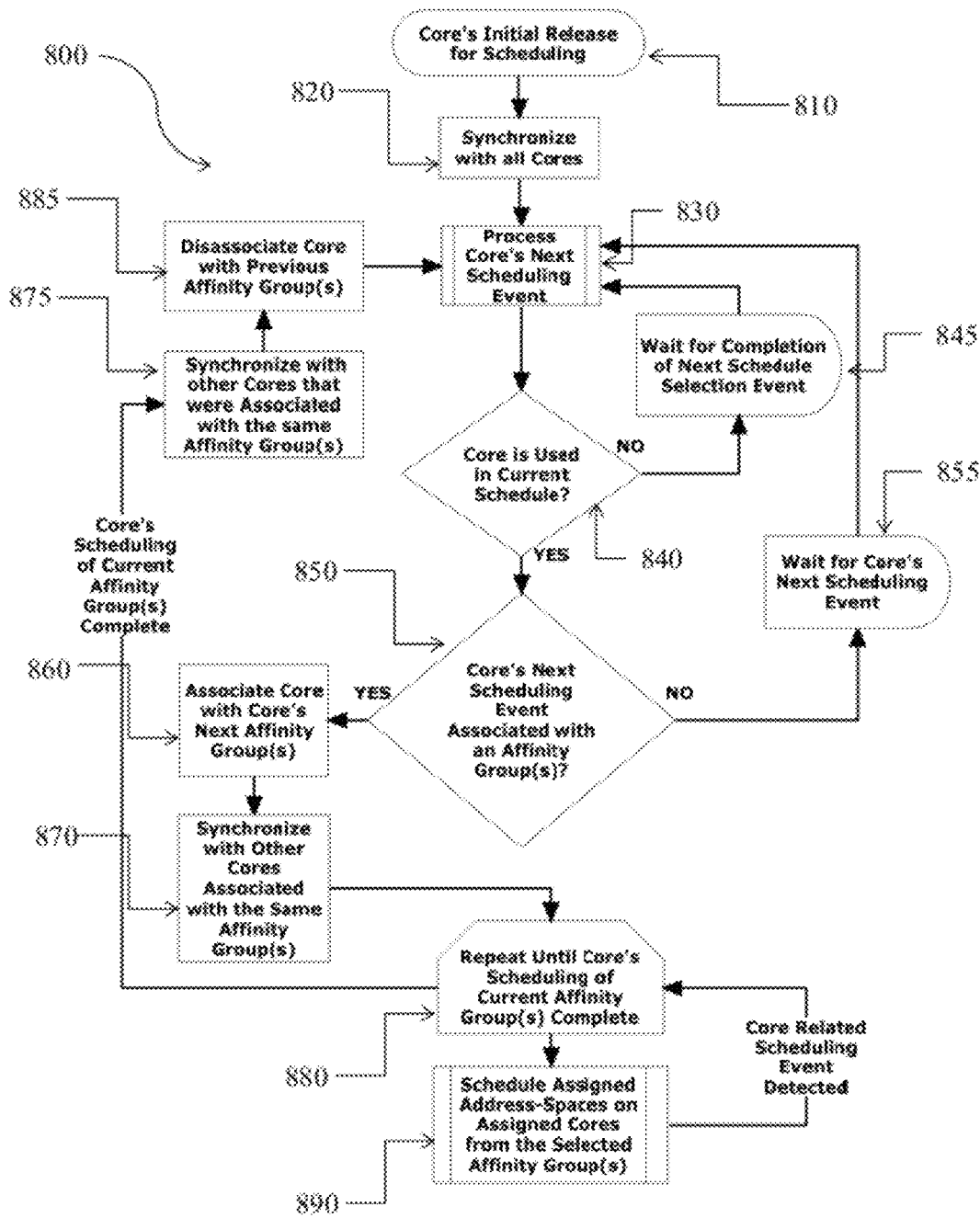
FIG. 8 contains a control flow diagram for scheduling affinity groups on a core and synchronizing the core with other cores belonging to the same affinity groups according to aspects of the present invention.

FIG. 8 illustrates an exemplary main control flow for scheduling affinity groups on the multi-core processor. The sequence 800 illustrated in FIG. 8 occurs for each core within the multi-core processor. When each core has been initially released for scheduling 810, and following any potential synchronization with the other processor cores 820, each core's next scheduling event is processed 830. The method covers any selection of an affinity group or affinity groups from the affinity groups defined in the current schedule, including methods without specific enforcements and methods that include specific enforcements.

Figure 9:
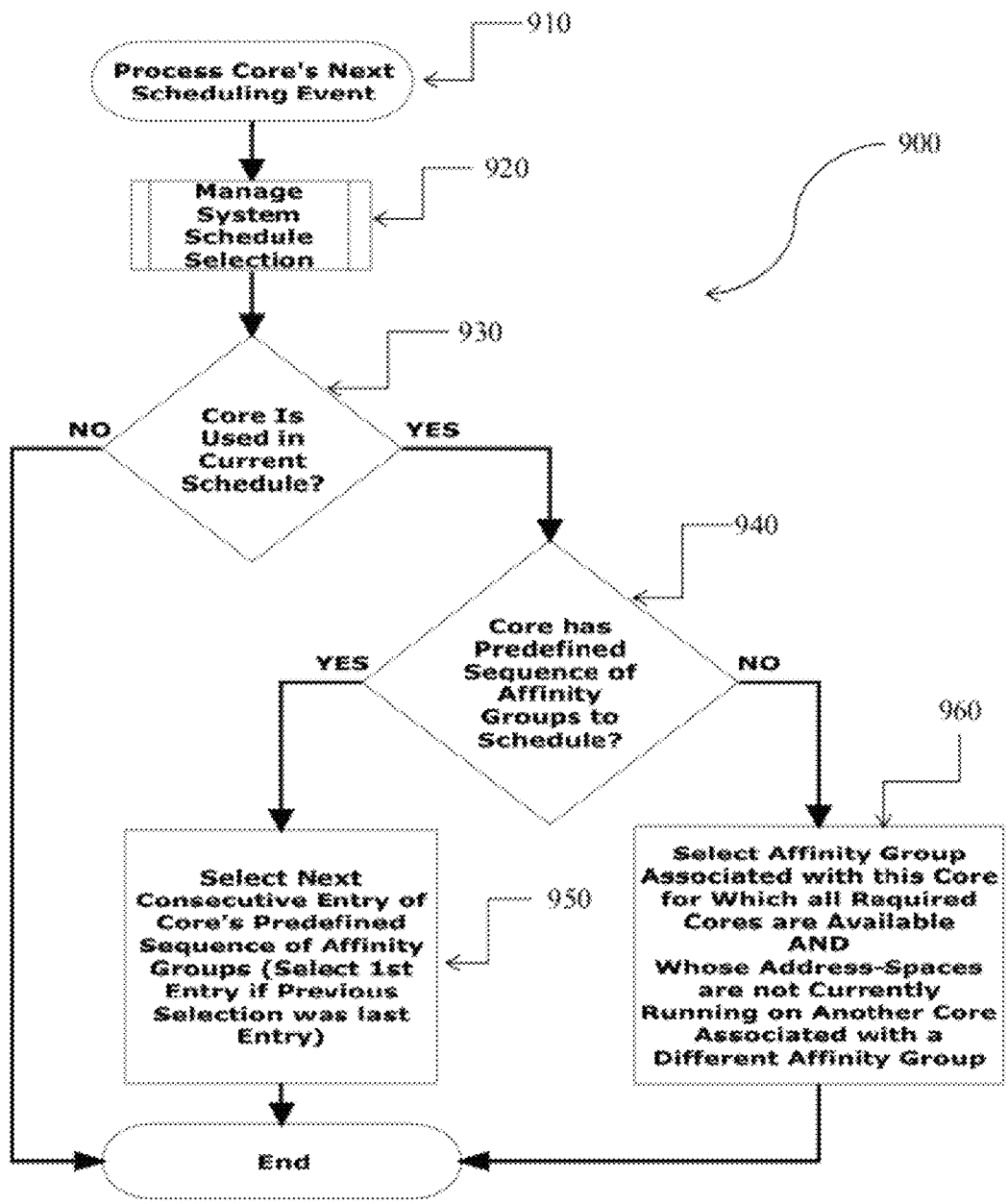
FIG. 9 contains a control flow diagram for selecting a core's next scheduling event for the current schedule when utilizing some of the optional scheduling enforcements covered by the method according to aspects of the present invention.

One possible optional enforcement, for illustrative purposes, is illustrated in the control flow diagram 900 included in FIG. 9. A core's next processing event is processed 910 and system schedule selection is managed at 920. In this illustration, two possible enforcements on affinity group selection are shown. For the illustrated embodiment, if the core is used in the current schedule 930 then it is determined if the core has a predefined sequence of affinity groups to schedule 940. If the core does, then the next consecutive entry of the core's predefined sequence of affinity groups is selected 950. If the previously selected affinity group was the last in the sequence, then the first would be selected. If the core does not have a predefined sequence of affinity groups to schedule, then the affinity group associated with this core for which all required cores are available and whose address spaces are not currently running on another core associated with a different affinity group could be selected 960. In this example, a predefined sequence of affinity groups could have been defined and sequentially selected for each of the core's scheduling events.

Figure 4:
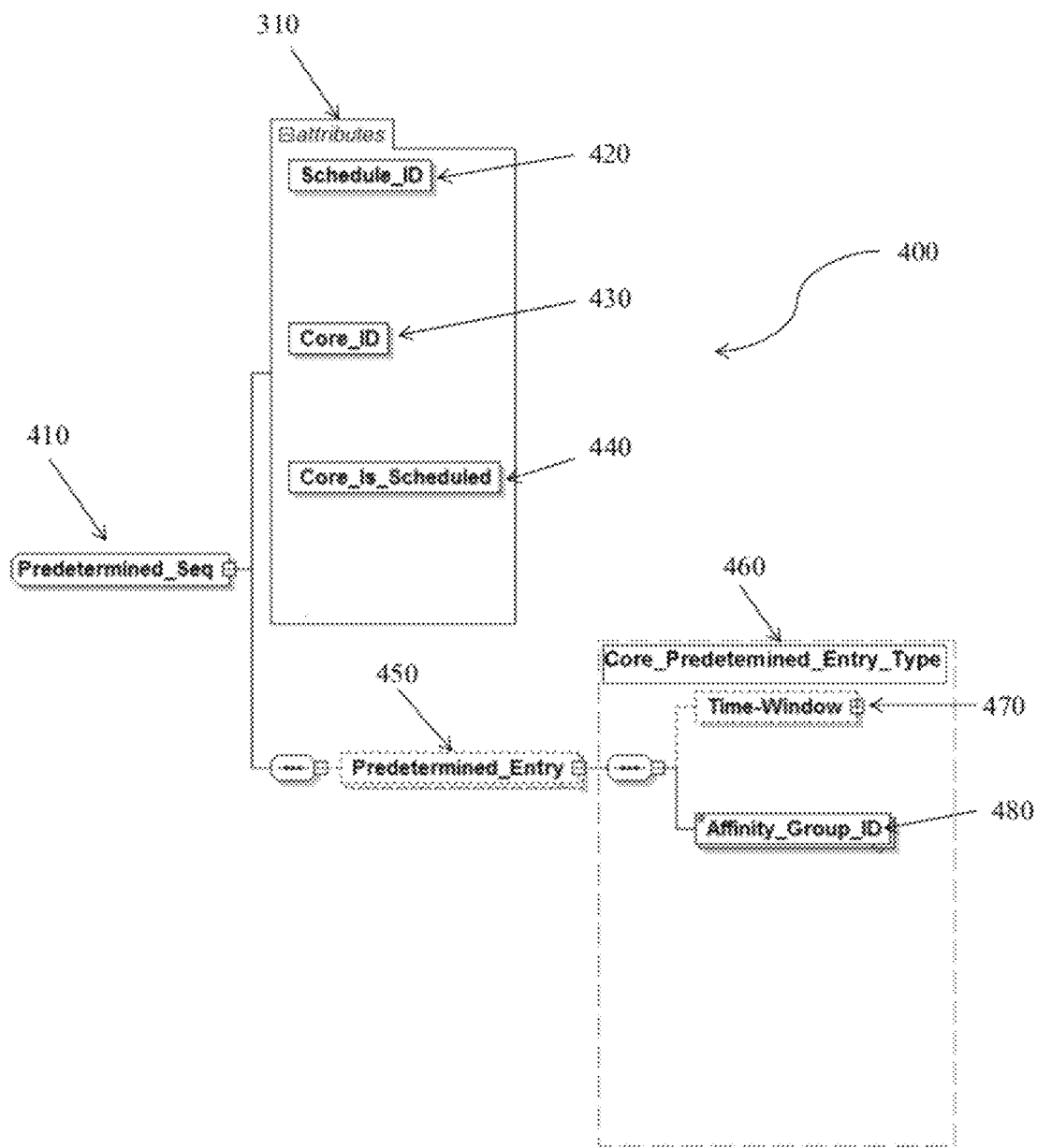
FIG. 4 shows attribute definitions and associations for an example core's predetermined sequence of affinity groups according to aspects of the present invention.
Figure 7:
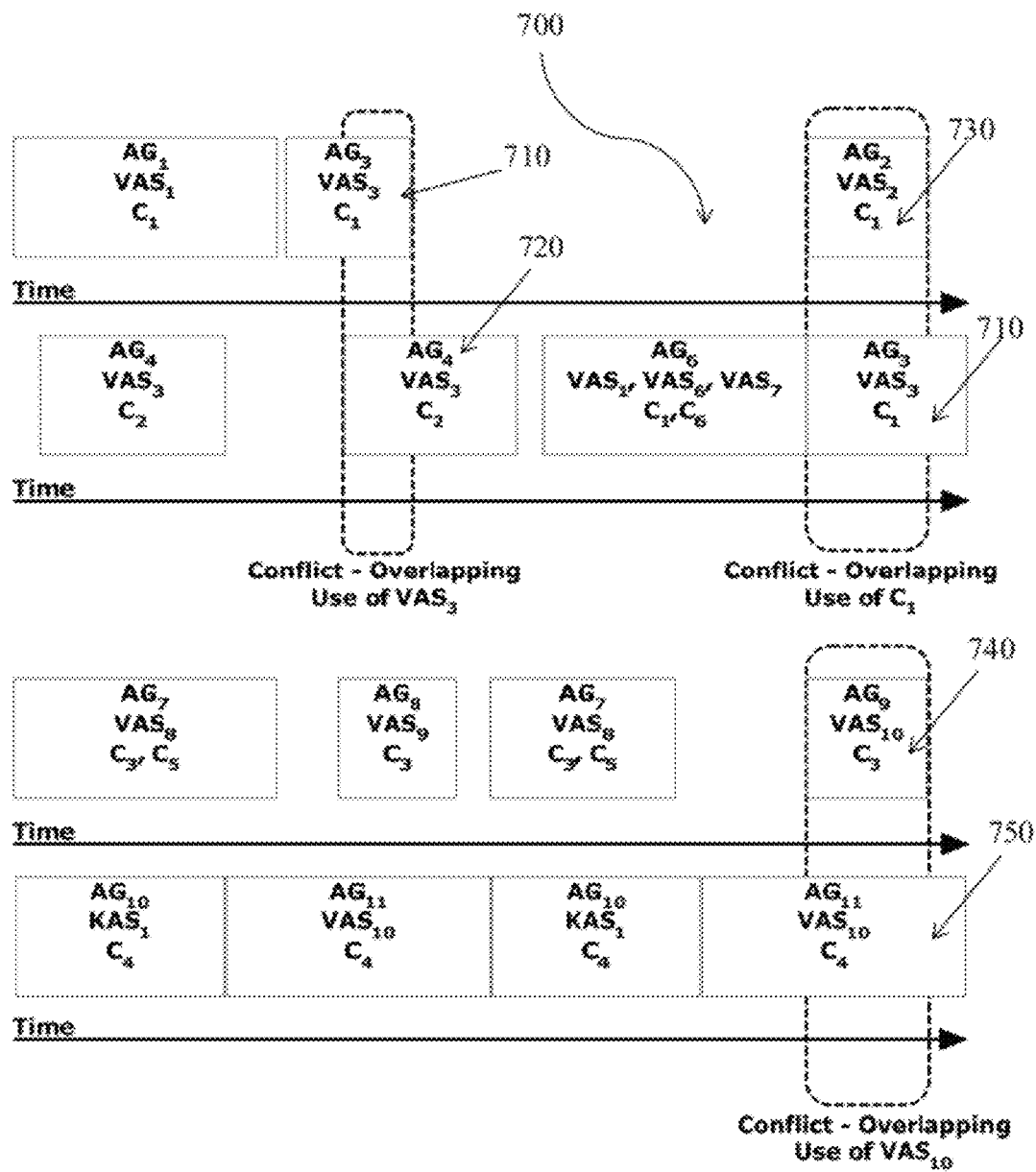
FIG. 7 shows examples of scheduling conflicts for affinity groups that would occur when utilizing some of the optional scheduling enforcements covered by the method according to aspects of the present invention.

FIG. 4 shows an example data structure 400 that could be utilized to define such sequential sequences. The FIG. 4 example data structure shows optional time windows that could be used for core scheduling events. A predetermined sequence 410 may include a predetermined sequence of entries to schedule on a particular core. The predetermined sequence 410 may include attributes 310, which may include but not be limited to a Schedule_ID 420 which defines the schedule to which the predetermined sequence 410 belongs; a Core_ID 430, which defines the core with which the predetermined sequence 410 is associated; and a Core_Is_Scheduled attribute 440, which defines whether the core is used in the referenced schedule or is a spare core with respect to the referenced schedule. The predetermined sequence may further include zero or more Predetermined_Entry 450 based on a Core_Predetermined_Entry_Type 460 that comprises a list of predetermined sequence entries of affinity group assignments for the core. The predetermined sequence 410 may further comprise one or more Affinity_Group_IDs 480 that may include identification of one or more affinity groups associated with an optional Time-Window 470 that may include an optional start-time and duration. Core scheduling events are not limited to time windows and could occur on any event possible within the multi-core platform and its peripheral environment. A second possible optional enforcement, also shown in FIG. 9, is to restrict affinity group selection to those affinity groups whose member address-spaces are not already running on another core as a member of a different affinity group. Example potential conflicts when using this optional enforcement are shown in FIG. 7. Exemplary conflicts may include those shown in schedule 700. In the exemplary schedule, affinity group 3 710 and affinity group 4 720 are scheduled in overlapping time slots, creating a conflict because both include virtual address space 3. Similarly, a conflict is created because affinity group 3 710 and affinity group 2 730 are both scheduled in overlapping time slots and both include core 1. Another exemplary conflict is shown in schedule 700 because affinity group 9 740 and affinity group 11 750 both include virtual address space 10 and have overlapping time slots. These optional enforcements are illustrative only, any means can be utilized to select affinity groups from the current schedule as well as select additional address-spaces for scheduling on cores not currently being utilized for the current schedule.

In FIG. 8, once processing of the core's next scheduling event 830 is complete, and the core is being utilized for the current schedule 840 and one or more affinity groups were selected to schedule on the core 850, a scheduling association between the core and the selected affinity group(s) is made 860, the core optionally synchronizes with other cores associated with the same affinity group 870 (e.g., for data or time consistency), and scheduling of address-spaces from the affinity group(s) selected for the core begins 880. While waiting until the core's scheduling of the current affinity group(s) to complete 880, the process schedules address-spaces of the selected affinity group(s), utilizing the set of cores associated with the selected affinity groups(s) 890, repeating until the core's scheduling of the current affinity group(s) is complete. Before processing the core's next scheduling event 830, the cores associated with an affinity group may be synchronized 875 and one or more cores may be disassociated with any previous affinity groups 885. The key enforcement is that only the address-spaces from the affinity group(s) selected for the core are scheduled on the core. The scheduling of address-spaces from the selected affinity group(s) continues until a core related scheduling event occurs that signifies end of scheduling for the current affinity groups. At the end of the scheduling for the current affinity groups, the associated address spaces are released for scheduling in future scheduling events. Then the processing of the core's next scheduling event occurs, completing the loop that results in another scheduling sequence for the core.

As shown in FIG. 8, if the core is not currently utilized in the current schedule, the core waits for the completion of the next schedule selection event 845 to determine if it will be directly utilized in the current schedule. Also, if the core is used in the current schedule, but no affinity groups were selected as part of processing the core's next scheduling event, the core waits for the occurrence of the next core's next scheduling event 855. Address-spaces can be assigned to and scheduled on cores when they are not being utilized as part of the current schedule.

To reduce interference between cores, timing events associated with one affinity group are restricted to affecting, at most, only the processor cores assigned to the affinity group.

Exemplary applications of embodiments of the present invention may include a method for defining affinity groups that consist of an association of processor cores, address-spaces, and authorizations (as shown, for example, in FIG. 1B and FIG. 2B). Such a method may include:

a. Identification:
  i. Identification of one or more unique affinity groups (AG1, AG2, . . . AGN).
  ii. Identification of two or more unique processor cores (C1, C2, . . . CP).
  iii. Identification of one or more unique virtual address-spaces (VAS1, VAS2, . . . VASM).
  iv. Identification of zero or more unique kernel address-spaces (KAS1, KAS2, . . . KASQ).
  v. Identification of zero applications (e.g., no explicit specification of) or more applications (e.g., explicit specification of) that are associated with an address-space.
b. Assignment:
  i. Assignment of one or more processor core identifications as members of an affinity group.
  ii. Assignment of zero or more kernel address-space identifications as members of an affinity group.
  iii. Assignment of zero or more virtual address-space identifications as members of an affinity group.
c. Enforcement:
  i. Enforcement that each affinity group has at least one processor core assigned to it.
  ii. Enforcement that each affinity group has at least one address-space assigned to it.

Another exemplary application of embodiments of the present invention may include a method for generating schedules for the defined affinity groups (as shown, for example, in FIG. 3, with example schedules shown in FIG. 5 and FIG. 6). Such a method may include:

a. Identification:
  i. Identification of one or more unique schedules (S1, S2, . . . SS).
b. Assignment:
  i. Assignment of one or more affinity groups to a schedule.

Another exemplary application of embodiments of the present invention may include a method for enforcing the currently selected schedule on a multi-core processor (as shown, for example, in FIG. 8 and FIG. 9). Such a method may include:

a. Selecting of affinity groups to be scheduled from the available affinity groups defined for the currently selected schedule. Such a method may cover selecting affinity groups based on any selection sequence. This may include an optional predefined sequence of affinity groups for the core (FIG. 4 shows example attributes and associations for a predefined sequence) and sequences (example potential conflicts shown in FIG. 7) for which the following principles may be optionally enforced:
  i. At any instant of time, a core can be selected to be associated with, at most, one of the available affinity groups.
  ii. At any instant of time, an address-space can be associated with, at most, one of the affinity groups selected to run on a core or set of cores (i.e., if already running on one core or set of cores as part of one affinity group, an address-space cannot run on other cores as part of other affinity groups).
b. Scheduling of an affinity group (or affinity groups) associated with the currently selected schedule.
  i. When an affinity group (or affinity groups) is active, scheduling of only the assigned address-spaces on the assigned cores.
    A. Only applications associated with the address-spaces assigned to an affinity group are eligible to be executed on the cores assigned to the same affinity group.

ii. When a currently active affinity group (or affinity groups) completes, the assigned address-spaces are not eligible to be scheduled on the assigned cores as part of the affinity group that completed.
c. Isolation of timing events for one affinity group to only affect, at most, the processor cores assigned to the affinity group.

Another exemplary application of embodiments of the present invention may include a method for enforcing the defined schedules on a multi-core processor (as shown, for example, in FIG. 8 and FIG. 9). Such a method may include:
a. Selecting a schedule and enforcing the schedule and its associated affinity groups on the multi-core processor.
b. Scheduling of address-spaces on cores which are currently not being utilized for the current schedule.

Figure 10A:
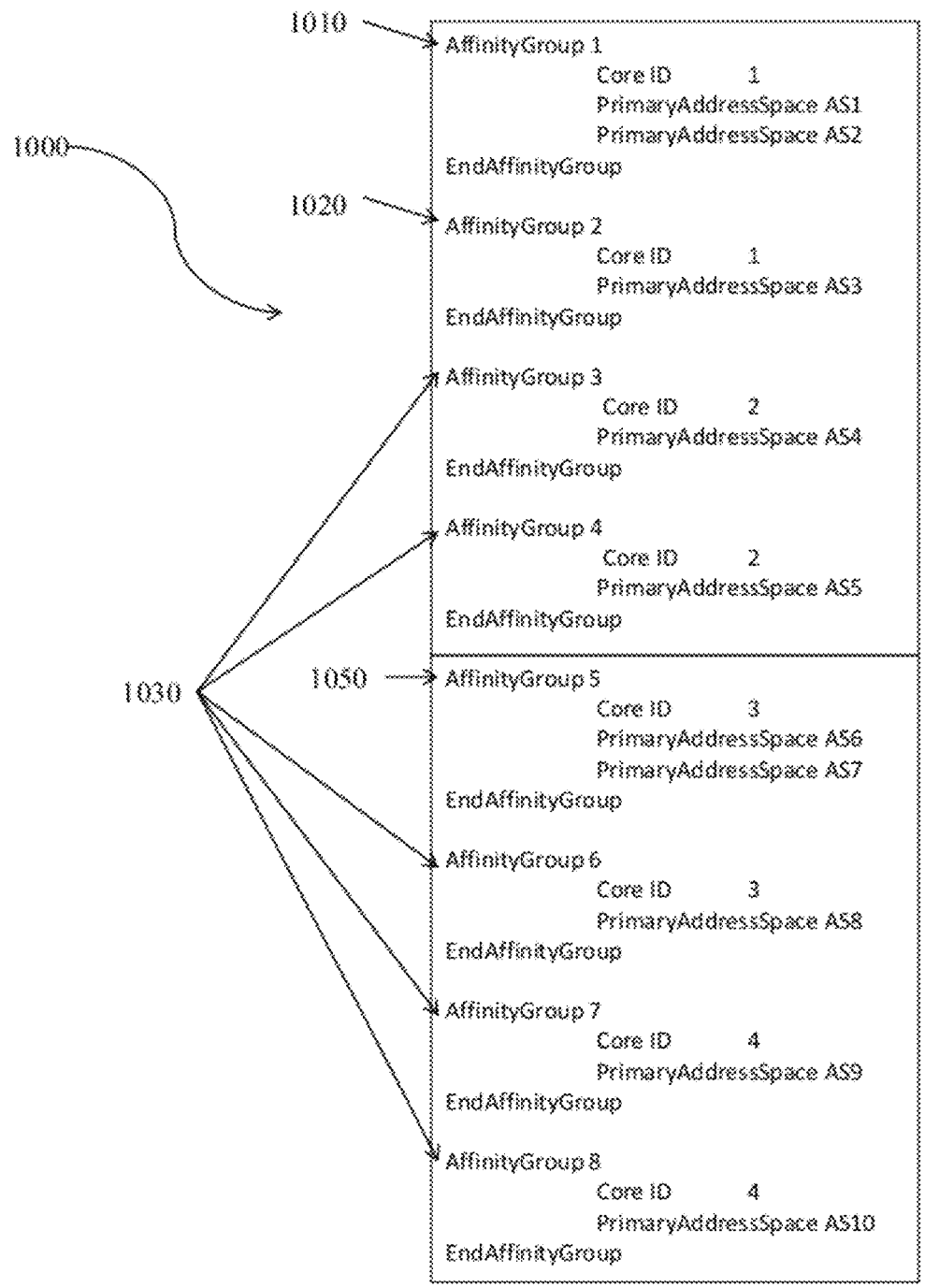
FIG. 10A shows sample affinity group associations of address-spaces and cores with each affinity group utilizing unique cores and one or more unique address-spaces. This is exemplary of an Asymmetric Multiprocessing (AMP) configuration using the method according to aspects of the present invention.

FIG. 10A shows an exemplary configuration of affinity groups 1000 that may be used, for example, in an AMP configuration on a 4-core multi-core processor. The AMP configuration can be a stand-alone configuration or part of a larger AMP/SMP hybrid configuration. Affinity Group 1 1010 is assigned to Core 1 and contains primary address spaces AS1 and AS2. While Affinity Group 1 is executing in this example, only applications belonging to AS1 and AS2 would be executing on Core 1. Affinity Group 2 1020 is also assigned to Core 1 but is being used solely for AS3. Assigning one address-space per affinity group may provide maximum scheduling flexibility. Affinity Group 5 1050 is assigned to core 3 and contains primary address spaces AS6 and AS7. The other affinity groups 1030 in the example are all single address-space groupings utilizing the remaining cores. In the example, each core is treated as its own unique and independent subsystem. Each subsystem within the system has no dependence on any of the other affinity groups within the system. In some hybrid configurations, it is possible to define various subsystems, but unlike the configuration of FIG. 10A, the cores can be dynamically allocated to different subsystems each time a subsystem is scheduled.

FIG. 10B shows a data structure and configuration that may be used to control the scheduling of the affinity groups of FIG. 10A. The configuration demonstrates just one of many possible schedules that can be created using the data structure. It is also possible to have multiple data structures and configured schedules for the same affinity groups. The particular data structure and schedule activated for scheduling may be selected by the operating system or user. The configuration shown in FIG. 10B consists of one overall schedule 1050 with four sub-schedules 1060-1090 within it. Each sub-schedule 1060-1090 implicitly corresponds to a particular core as defined by the affinity groups within the sub-schedule. Each sub-schedule 1060-1090 further contains two sections, one per affinity group. In the example, the schedule 1050 is performed over a major period of 20 time windows. The sub-schedules 1060-1090 define how the 20 time windows are allocated to the affinity groups assigned to them and the sequence of the affinity groups within that sub-schedule. It should be noted that it is possible to configure different schedules to use different major periods and that they may overlap with schedules of different sizes.

Figure 10C:
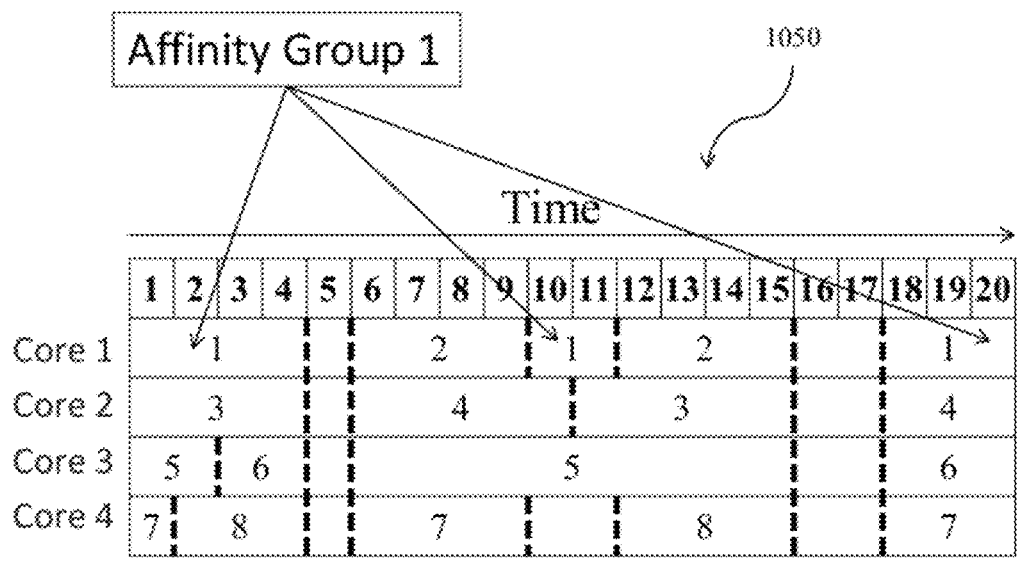
FIG. 10C graphically illustrates the schedule implemented by FIG. 10B for the affinity groups of FIG. 10A.

FIG. 10C graphically illustrates the overall schedule 1050 defined in FIG. 10B for the affinity groups defined in FIG. 10A. As can be seen in FIG. 10C, the affinity groups are only executed on the cores to which they are assigned by the affinity group definitions of FIG. 10A, and only execute for the predefined time periods and in the predefined sequence given in FIG. 10B. The different affinity groups may execute simultaneously on their associated cores per the configuration of FIG. 10B. It should be noted that the particular schedules defined in FIG. 10B left some unscheduled time in time windows 5, 16 and 17. These unscheduled time windows may be allocated in the future to affinity groups that need more time. They can then be allocated to be used for restart address spaces, as well as background address spaces, as will be discussed in the following example.

FIG. 11A shows a more advanced affinity group configuration 1100 in accordance with certain embodiments of the invention. The example may be applied to SMP or hybrid AMP/SMP systems. In the displayed embodiment, Affinity Group 1 1110 is assigned to cores 1, 2 and 3 and consists of Address Space 1 (AS1). Affinity Group 2 1120 consists of two primary address spaces, AS2 and AS3. AS2 and AS3, when executed as part of Affinity Group 2, are allowed to share cores 1, 2 and 3. Affinity Group 3 1130 makes use of the same cores as Affinity Groups 1 and 2 but consists of three primary address spaces (AS4, AS5 and AS6) and three background address spaces (AS1, AS2 and AS3). The three background address spaces have a Background Max Priority of 10. Note that Affinity Group 3 cannot be run concurrently with Affinity Groups 1 and 2 not only because they share the same cores, but also because Affinity Group 3 contains the same address spaces as Affinity Groups 1 and 2.

Affinity Group 4 1140 consists of primary address space AS7 and utilizes cores 1, 2 and 3. Affinity Group 5 1150 consists of primary address space AS8 and also utilizes cores 1, 2 and 3. Affinity Group 6 1160 utilizes cores 1, 2 and 3 but contains no primary address spaces. It defines eight background address spaces (AS1 through AS8) with a Background Max Priority of 15, and one restart address space (AS1). When address spaces are scheduled as background address spaces, they may be scheduled based on their priority and may be bounded by the Background Max Priority. The restart address space (AS1) may restart in any available time during Affinity Group 6's allotted time. Affinity Group 7 1170 is assigned to core 4 and has four background address spaces (AS1, AS4, AS5 and AS6) and three restart address spaces (AS4, AS5 and AS6). The Background Max Priority is 15. Affinity Group 7 1170 can execute concurrently with Affinity Groups 2, 4, and 5 as they have no address-space or core overlaps.

Figure 11B:
FIG. 11B shows a sample data structure and configuration that is used to control the scheduling of the affinity groups of FIG. 11A.

FIG. 11B shows an exemplary data structure and configuration 1180 that is used to control the scheduling of the affinity groups of FIG. 11A. The configuration demonstrates just one of many possible schedules that can be created using the data structure. It is also possible to have multiple data structures and configured schedules for the same affinity groups. The particular data structure and schedule activated for scheduling may be selected by the operating system or user. The exemplary configuration of FIG. 11B has a major period of 20 time windows. There is one sub-schedule that contains seven sections where each section corresponds to one of the affinity groups. Within each section, the start times of an affinity group is given as well as its run durations. It can be seen from the schedule that some time periods may contain more than one affinity group. This is more readily apparent in FIG. 11C.

Figure 11C:
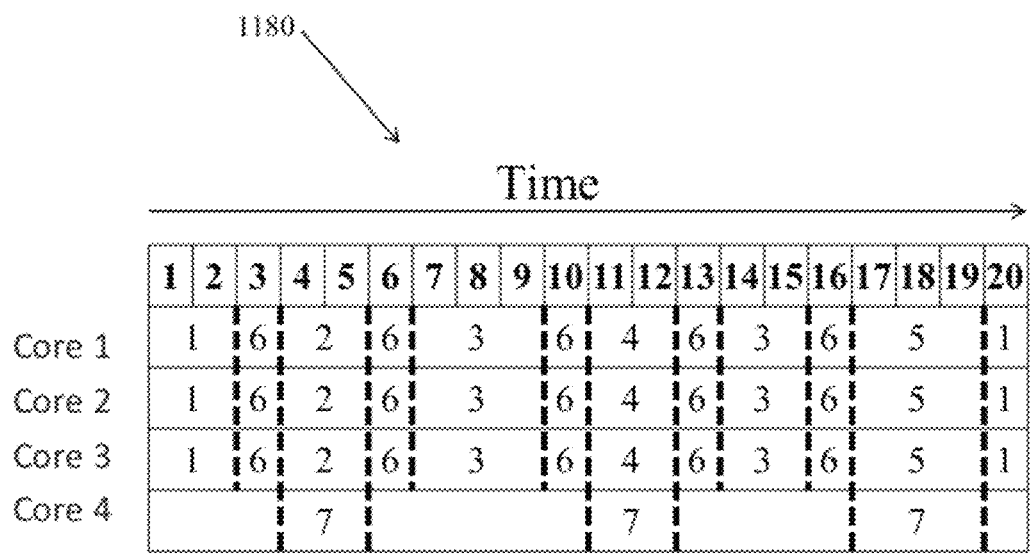
FIG. 11C graphically illustrates the schedule implemented by FIG. 11B for the affinity groups of FIG. 11A.

FIG. 11C graphically illustrates the schedule 1180 implemented by FIG. 11B. It is readily apparent that core 4 has only been assigned Affinity Group 7 and that the schedule for core 4 includes unallocated time that can be utilized in the future for growth. This growth may permit the addition of more tasks to some address spaces, the addition of new affinity groups, or the desire to give certain tasks more time so that they may complete more quickly. Growth may be utilized by assigning more time windows to certain affinity groups or by assigning new cores. The only overlaps that exist between different affinity groups in this example are those that do not share any address spaces or cores. This is due to an optional enforcement, discussed previously, that prevents the same address space from being executed concurrently in more than one affinity group.

Figure 12A:
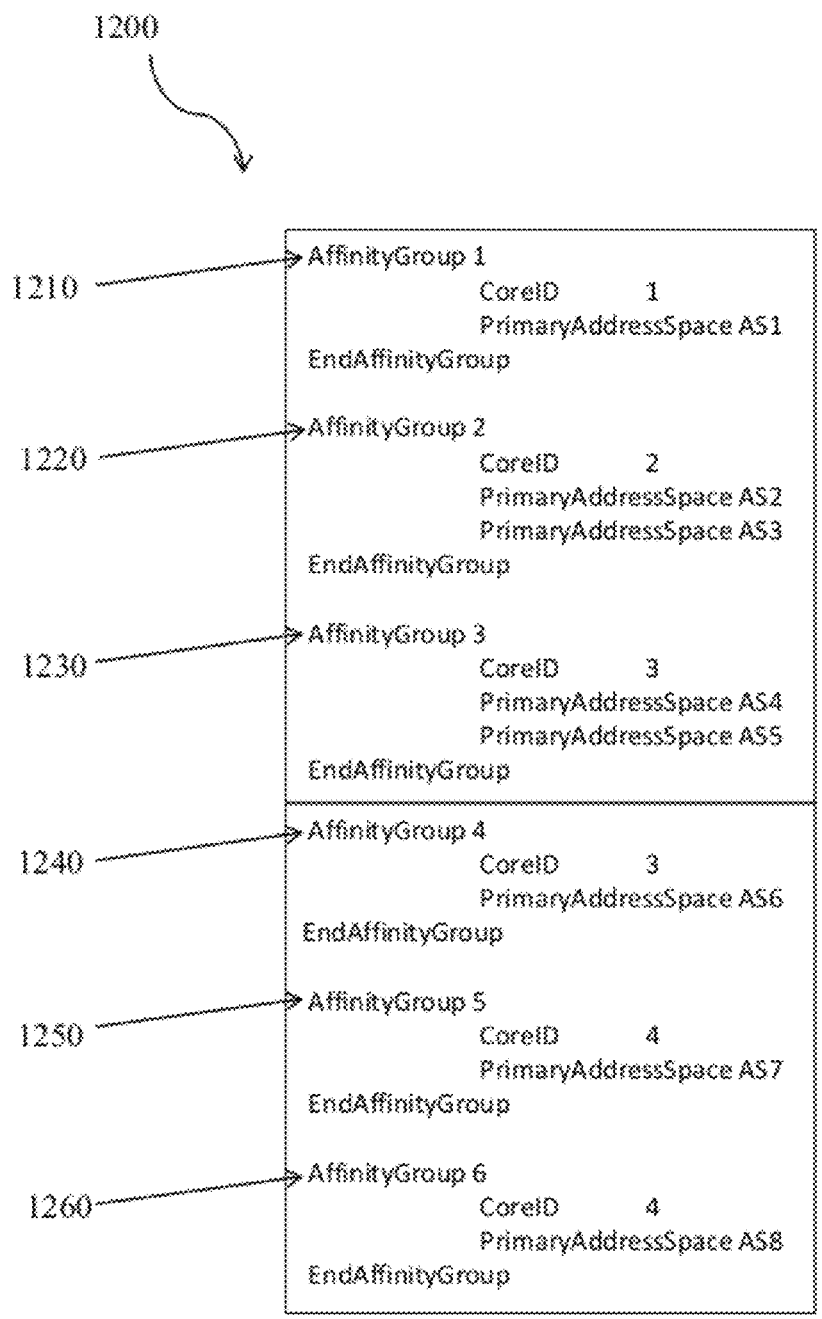
FIG. 12A shows sample affinity group associations of address-spaces and cores with some affinity groups utilizing unique cores and one or more unique address-spaces and other affinity groups sharing cores. This is exemplary of an AMP configuration using the method according to aspects of the present invention.

FIG. 12A exemplifies an alternate affinity group arrangement 1200 the potential affinity groupings that may be configured for an AMP or AMP/SMP hybrid system. Affinity Group 1 1210 is configured to use core 1 for primary address space AS1. Affinity Group 2 1220 is configured to use core 2 for primary address spaces AS2 and AS3. Affinity Group 3 1230 is configured to use core 3 for primary address spaces AS4 and AS5. Affinity Group 4 1240 also uses core 3 but for primary address space AS6. Affinity Group 5 1250 and Affinity Group 6 1260 both use core 4 but for primary address spaces AS7 and AS8 respectively. The groupings in this example may be used to define a system with four subsystems where the first subsystem comprises Affinity Group 1 1210, the second subsystem comprises Affinity Group 2 1220, the third subsystem comprises Affinity Groups 3 1230 and 4 1240, and the fourth subsystem comprises Affinity Groups 5 1250 and 6 1260. The different subsystems may be scheduled independently of each other as they do not share any cores or address spaces between them.

Figure 12B:
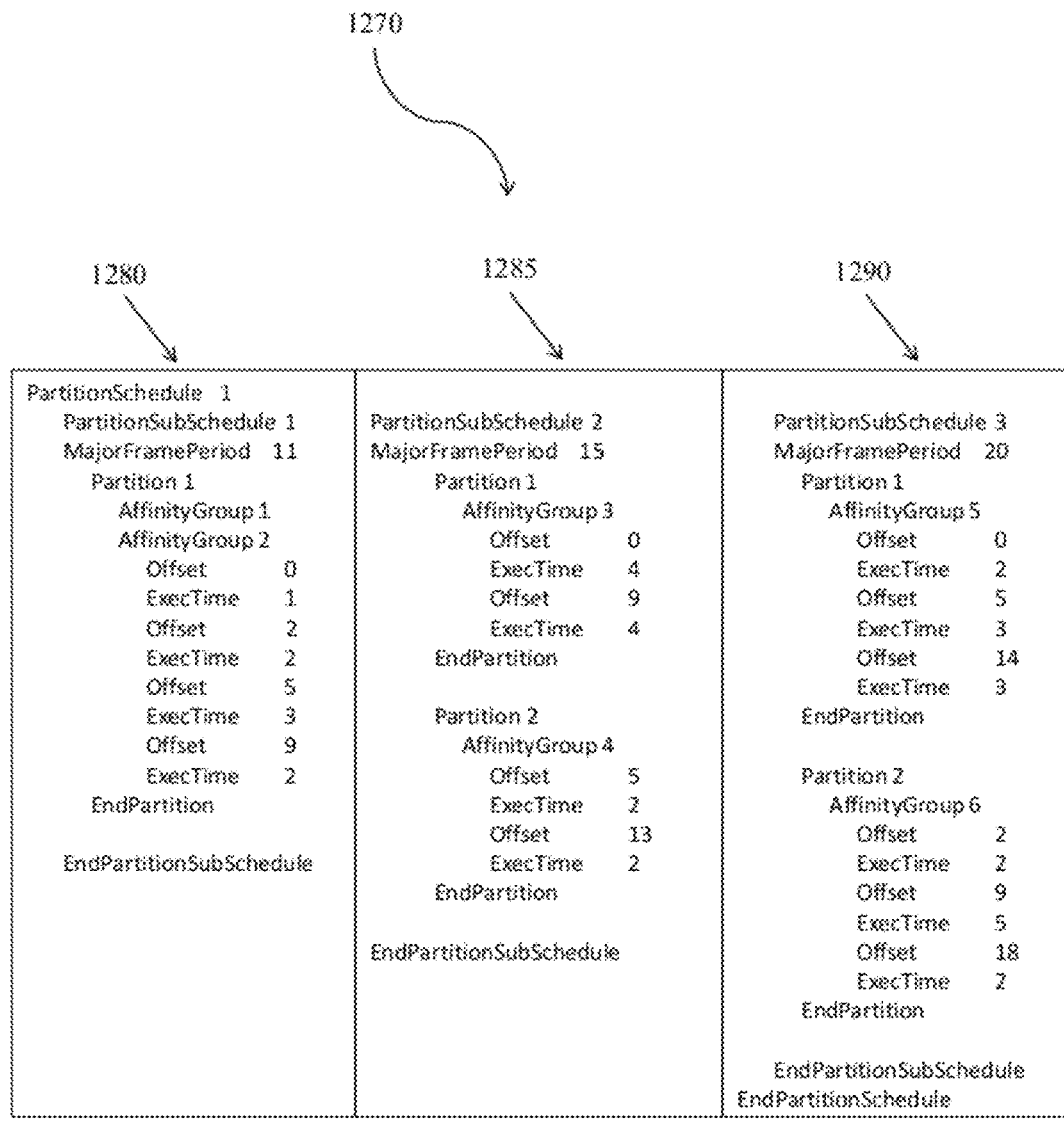
FIG. 12B shows a sample data structure and configuration that is used to control the scheduling of the affinity groups of FIG. 12A. The configuration uses different major time periods for the different subsystems.
Figure 12C:
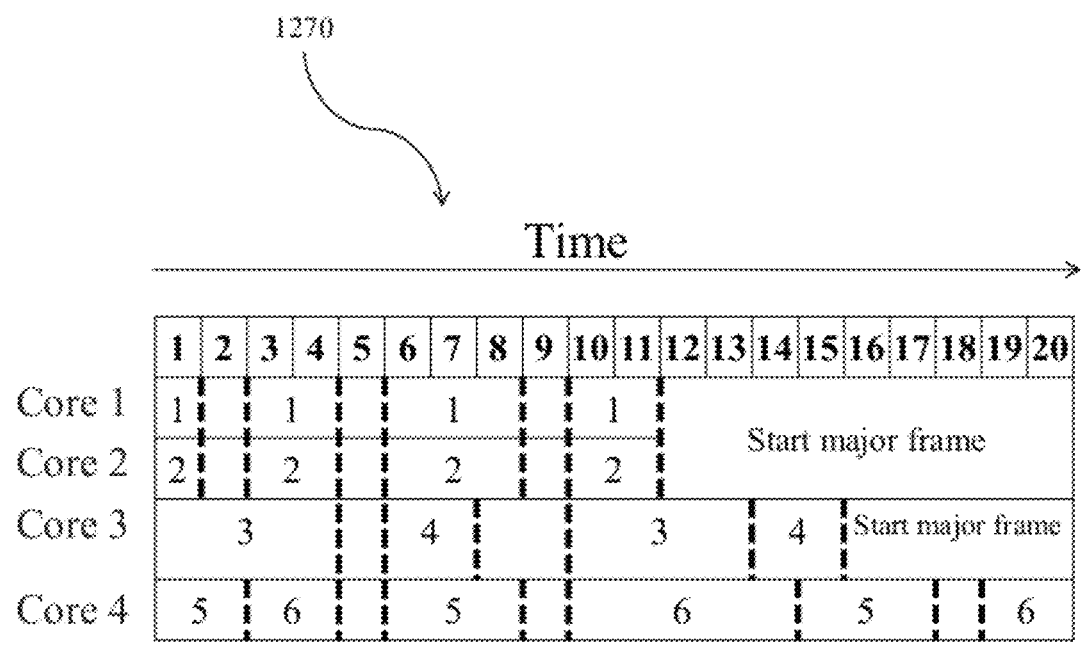
FIG. 12C graphically illustrates the schedule implemented by FIG. 12B for the affinity groups of FIG. 12A.

FIG. 12B displays one of many possible schedules 1270 for the affinity groups of FIG. 12A. A notable difference between FIG. 12B and the previously presented schedules is the addition of different major time periods for the different sub-schedules. The first sub-schedule 1280 has a period of 11 time windows and is used to schedule Affinity Groups 1 and 2. Affinity Groups 1 and 2 have the same configuration in this example. The second sub-schedule 1285 has a major time period of 15 time windows and is used to schedule Affinity Groups 3 and 4. The third sub-schedule 1290 has a major time period of 20 time windows and is used to schedule Affinity Groups 5 and 6. It can be noted that the exemplary scheduler data structure has configured the system as having 3 subsystems where each sub-schedule is the schedule of a subsystem. If the applications in Affinity Groups 1 and 2 are independent of each other, it can be said that there are four subsystems represented in the schedule. FIG. 12C graphically depicts the schedule 1270 of FIG. 12B. The major time periods may start over as soon as they have completed.

Figure 13A:
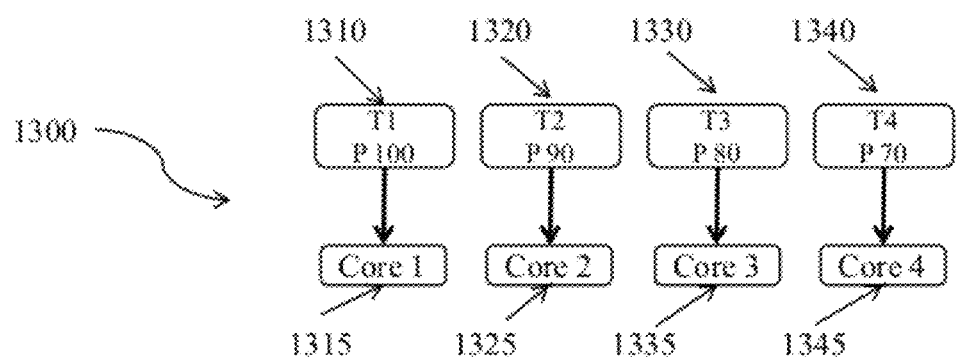
FIG. 13A and FIG. 13B show an example of task-core affinity scheduling.
Figure 13B:
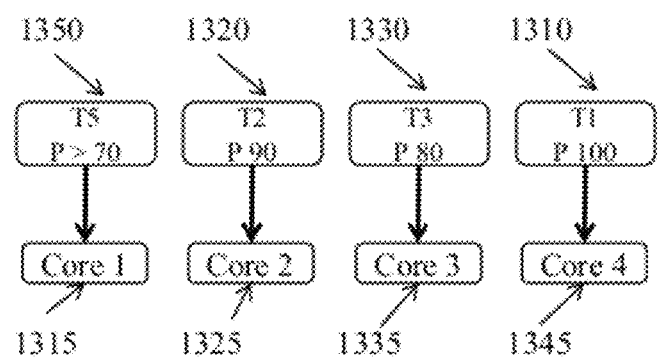

Task-core affinity may be used to limit tasks to a specific core. If a task-core affinity is set for a particular task, that task will only be able to run on the core specified in the task core affinity. If task-core affinity is set for one or more tasks, the system scheduling may be priority-based preemptive scheduling as allowed by address space and task core affinity. For example, FIG. 13A shows four exemplary tasks 1310, 1320, 1330 and 1340 running on four cores 1315, 1325, 1335 and 1345 simultaneously. These four exemplary tasks 1310, 1320, 1330 and 1340 may be part of the same address-space and/or affinity group. The tasks in this example may be scheduled based on their priorities. For this example, Task 5 (T5) 1350 cannot be scheduled to run until its priority exceeds 70 and it can only be run on Core 1 as it has a task-core affinity set for Core 1. In FIG. 13B, T5's 1350 priority now exceeds 70 and it is ready to be run. T1 1310 is moved by the scheduler from Core 1 1315 to Core 4 1345, displacing the lowest priority task. T5 1350 is then run on Core 1 1315. Task-core affinity may be preset. A particular task-core affinity may be optionally designated to be changeable at runtime. A task-core affinity may be designated as changeable at run-time by setting a SetTaskCoreAffinity attribute as True. SetTaskCoreAffinity=False may be the default condition so that the task-core affinity for only those tasks for which SetTaskCoreAffinity=True may be changeable at run-time. If a task-core affinity is not designated as changeable at run-time, the task-core affinity may be locked to the preset task-core affinity, if any. In certain embodiments, the task-core affinity may be changed in the definition of an affinity group that includes the address space including the particular task, which may be possible independent of the setting of a SetTaskCoreAffinity attribute. If no task-core affinity is set for a particular task, the task will be assigned to a core in accordance with the address space and affinity group associations for that particular task.

Figure 14:
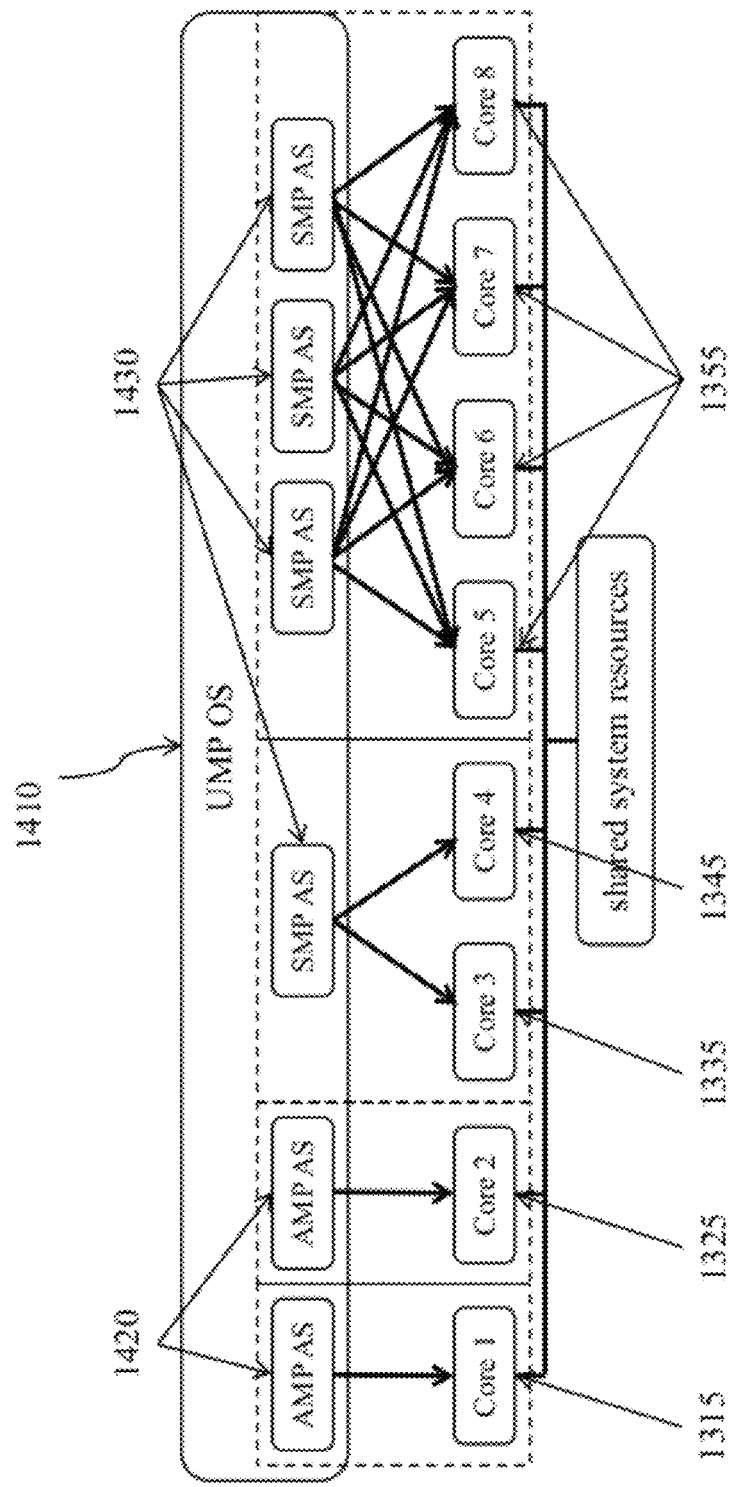
FIG. 14 shows an example of a Unified Multiprocessing (UMP) system.

The methods described can be used to implement many types of processing systems. Two examples of such systems are given in FIG. 14 and FIG. 15. Other systems may be implemented with the described methods, including but not limited to AMP, SMP, HMP (Heterogeneous Multi Processing), and others. FIG. 14 shows an exemplary Unified Multi Processing (UMP) system 1410 using eight cores. Cores 1 1315 and 2 1325 are assigned to AMP address spaces 1420, cores 3 1335 and 4 1345 are assigned to a SMP address-space 1430, and cores 5-8 1355 are assigned to three more SMP address spaces. Each one of these assignments may be configured using affinity groups. The assignments for cores 5 through 8 1355 can be performed using one, or as many as three, affinity groups. There are four subsystems exemplified in FIG. 14.

Figure 15:
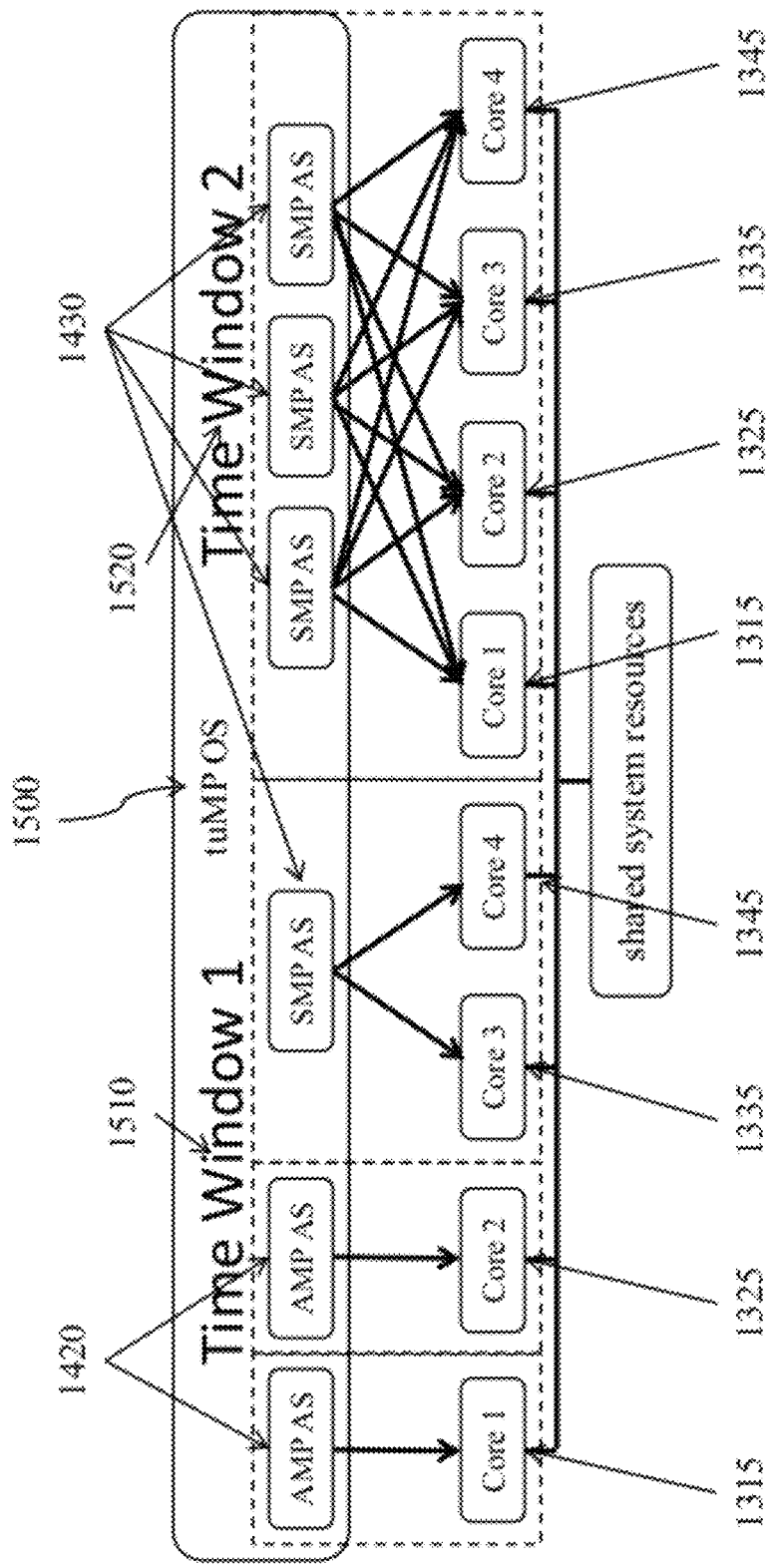
FIG. 15 shows an example of a Time-Variant Unified Multiprocessing (tuMP) system.

FIG. 15 shows an exemplary Time-Variant Unified Multi Processing (tuMP) system 1500 that can be implemented using the described methods. The tuMP system 1500 allows an S-core implementation, as shown in FIG. 14, to be implemented on a 4-core microprocessor. Time Window 1 1510 and Time Window 2 1520 may be configured using schedules and sub-schedules as discussed in the descriptions of FIG. 10B and FIG. 11B. In a first schedule, there may be three affinity groups that are implemented on cores 1 1315 thru 4 1345. In a second schedule, cores 1 1315 thru 4 1345 are used for only one affinity group. The same system may also be implemented in a single schedule that utilizes sub-schedules. Many variations of schedules and affinity groups are possible to create such systems and the path taken would be determined by the specific requirements of the system being designed.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub combination of the elements from the different species and/or embodiments disclosed herein.

We claim:

1. A method for scheduling applications on a multi-core processor comprising a plurality of processor cores, the method comprising:

associating a first at least one processor core and a first plurality of address spaces with a first affinity group;

associating a second at least one processor core and a second plurality of address spaces with a second affinity group; and scheduling one or more of the first affinity group and the second affinity group to execute on associated cores of the multi-core processor, wherein the step of scheduling further comprises:

releasing a first processor core for scheduling;

synchronizing the plurality of processor cores;

processing a scheduling event for the first processor core;

associating the first processor core with the affinity group associated with the scheduling event;

assigning a plurality of address spaces to the first processor core for the scheduling event;

synchronizing the first processor core with at least one of the plurality of processor cores associated with the affinity group associated with the scheduling event; and wherein scheduling further comprises scheduling at least one of the first one or more processor cores according to a predefined sequence of affinity groups.

2. The method of claim 1, wherein the scheduling event comprises task-core affinity for at least one task.

3. The method of claim 1, wherein at least one task-core affinity is designated to be changeable at run-time.

4. The method of claim 1, wherein a task-core affinity is designated not to be changeable at run-time.

5. The method of claim 1, further comprising synchronizing the first processor core with any of the plurality of processor cores associated with the scheduling event.

6. The method of claim 1, wherein processing the scheduling event comprises selecting an affinity group for which all of the associated cores are available and none of the associated address spaces are currently running on another core.

7. A method for scheduling applications on a multi-core processor comprising a plurality of processor cores, the method comprising:

associating a first at least one processor core and a first plurality of address spaces with a first affinity group;

associating a second at least one processor core and a second plurality of address spaces with a second affinity group; and scheduling one or more of the first affinity group and the second affinity group to execute on associated cores of the multi-core processor, wherein the step of scheduling further comprises:

releasing a first address space for scheduling;

synchronizing the plurality of processor cores;

processing a scheduling event for the first address space; and assigning the first address space to a processor core for the scheduling event;

synchronizing the first at least one processor core associated with the affinity group associated with the scheduling event; and wherein scheduling further comprises scheduling at least one of the first at least one processor core according to a predefined sequence of affinity groups and scheduling the first affinity group and the second affinity group to execute simultaneously on one or more cores of the multi-core processor.

8. The method of claim 7, wherein the first affinity group comprises at least one dependency group comprising a plurality of address spaces that share at least one resource.

9. The method of claim 8, further comprising scheduling a plurality of address spaces associated with at least one dependency group.

10. The method of claim 8, wherein the second at least one affinity group comprises at least one of the at least one dependency group.

11. The method of claim 7, wherein only applications associated with the first plurality of address spaces are eligible to be scheduled on the first at least one processor core when the first affinity group is being executed.

12. The method of claim 7, wherein at least one of the first plurality of address spaces is a primary address space eligible to run on any of the first at least one processor core.

13. The method of claim 7, wherein at least one of the first plurality of address spaces is a restart address space eligible to restart on any of the first at least one processor core.

14. The method of claim 7, wherein at least one of the first plurality of address spaces is a background address space eligible to run in the background on any of the first at least one processor core.

15. The method of claim 14, wherein the step of scheduling a background address space further comprises scheduling based on a priority less than a predetermined threshold.

16. The method of claim 7, wherein the step of scheduling further comprises activating one of a plurality of schedules for at least one of the associated cores.

17. The method of claim 7, wherein the first plurality of address spaces comprises at least one address space in the second plurality of address spaces.

18. The method of claim 7, wherein the first at least one affinity group comprises at least one address space in the second at least one affinity group.

19. The method of claim 7, further comprising scheduling a task to run on a processor core according to a task-core affinity for the task.

20. The method of claim 7, further comprising scheduling a task to run on a processor core according to a task-core affinity if the task has an affinity for a processor core associated with the affinity group scheduled for execution.

21. The method of claim 7, further comprising not scheduling a task for execution with an affinity group if the task has an affinity for a processor core that is not associated with the affinity group.

22. A method for scheduling applications on a multi-core processor comprising a plurality of processor cores, the method comprising:

associating a first at least one affinity group with a first subsystem;

associating a second at least one affinity group with a second subsystem; and synchronizing the first core with at least one of the plurality of processor cores associated with the affinity group associated with the scheduling event;

wherein scheduling further comprises scheduling at least one of the first one or more processor cores according to a predefined sequence of affinity groups; and wherein the first at least one affinity group has no cores in common and no address spaces in common with the second at least one affinity group, whereby the first subsystem can be scheduled independently of the second subsystem.

23. A system for scheduling applications on a multi-core processor, comprising:

a plurality of affinity groups each comprising one or more processor cores and a plurality of address spaces; and a scheduler configured for assigning one or more of the plurality of affinity groups to execute on associated cores of the multi-core processor, wherein the scheduler is further configured for:

releasing a first processor core for scheduling;

synchronizing the plurality of processor cores;

processing a scheduling event for the first processor core;

associating the first processor core with an affinity group associated with the scheduling event; and assigning a plurality of address spaces to the first processor core for the scheduling event;

synchronizing the first core with at least one of the plurality of processor cores associated with the affinity group associated with the scheduling event;

wherein processing the scheduling event comprises scheduling at least one of the first one or more processor cores according to a predefined sequence of affinity groups.

24. The system of claim 23, wherein the scheduling event comprises task-core affinity for at least one task.

25. The system of claim 23, wherein at least one task-core affinity is designated to be changeable at run-time.

26. The system of claim 23, wherein a task-core affinity is designated not to be changeable at run-time.

27. The system of claim 23, wherein the scheduler is further configured for synchronizing the first core with any of the plurality of processor cores associated with the scheduling event.

28. The system of claim 23, wherein the scheduler is further configured for selecting an affinity group for which all of the associated cores are available and none of the associated address spaces are currently running on another core.

29. A system for scheduling applications on a multi-core processor, comprising:
a plurality of affinity groups each comprising one or more processor cores and a plurality of address spaces; and
a scheduler configured for assigning one or more of the plurality of affinity groups to execute on associated cores of the multi-core processor and scheduling at least one of the first one or more processor cores according to a predefined sequence of affinity groups; and
synchronizing the first core with at least one of the plurality of processor cores associated with the affinity group associated with the scheduling event,
wherein the scheduler is further configured for:
releasing a first address space for scheduling;
synchronizing the plurality of processor cores;
processing a scheduling event for the first address space;
assigning the first address space to a processor core for the scheduling event; and
scheduling a first affinity group and a second affinity group to execute simultaneously.

30. The system of claim 29, wherein only applications associated with the address spaces assigned to an affinity group are eligible to be assigned to the processor cores assigned to the affinity group scheduled for execution.

31. The system of claim 29, wherein at least one of the plurality of affinity groups comprises at least one dependency group comprising a plurality of address spaces that share at least one resource.

32. The system of claim 31, wherein the scheduler is further configured for scheduling a plurality of address spaces associated with at least one dependency group.

33. The system of claim 32, wherein at least two of the plurality of affinity groups share a dependency group.

34. The system of claim 29, wherein the scheduler is further configured for activating one of a plurality of schedules for at least one of the associated cores.

35. The system of claim 29, wherein the scheduler is further configured for scheduling a task to run on a processor core according to a task-core affinity for the task.

36. The system of claim 29, wherein the scheduler is configured to schedule a task to run on a processor core according to a task-core affinity if the task has an affinity for a processor core associated with the affinity group scheduled for execution.

37. The system of claim 29, wherein the scheduler is configured not to schedule a task for execution with an affinity group if the task has an affinity for a processor core that is not associated with the affinity group.

38. The system of claim 29, wherein each of the affinity groups has no processor cores and no address spaces in common with any of the other of the plurality of affinity groups, to permit each of the plurality of affinity groups to be scheduled independently.

39. The system of claim 29, wherein the first plurality of address spaces comprises at least one address space in the second plurality of address spaces.

40. The system of claim 29, wherein the first at least one affinity group comprises at least one address space in the second at least one affinity group.

41. The system of claim 29, wherein the scheduler is further configured to propagate timing events of the first processor core to at most, the plurality of processor cores associated with the scheduling event.

42. A system for scheduling applications on a multi-core processor, comprising:
a plurality of subsystems each comprising one or more affinity groups, wherein each of one or more affinity groups comprises one or more processor cores and a plurality of address spaces; and
a scheduler configured for assigning one or more of the plurality of affinity groups to execute on associated cores of the multi-core processor, scheduling at least one of the first one or more processor cores according to a predefined sequence of affinity groups and synchronizing the first core with at least one of the plurality of processor cores associated with the affinity group associated with the scheduling event;
wherein each of the subsystems has no processor cores and no address spaces in common with any of the other of the plurality of subsystems, to permit each of the plurality of subsystems to be scheduled independently.

* * * * *